(12) United States Patent
Kimura et al.

(10) Patent No.: US 8,411,955 B2
(45) Date of Patent: Apr. 2, 2013

(54) IMAGE PROCESSING APPARATUS, IMAGE PROCESSING METHOD AND COMPUTER-READABLE MEDIUM

(75) Inventors: Shunichi Kimura, Kanagawa (JP); Ikken So, Kanagawa (JP); Masanori Sekino, Kanagawa (JP); Yutaka Koshi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1242 days.

(21) Appl. No.: 12/071,257

(22) Filed: Feb. 19, 2008

(65) Prior Publication Data

US 2008/0199081 A1 Aug. 21, 2008

(30) Foreign Application Priority Data

Feb. 21, 2007 (JP) ................................. 2007-041459
Apr. 18, 2007 (JP) ................................. 2007-109002

(51) Int. Cl.
*G06K 9/18* (2006.01)
(52) U.S. Cl. ......... 382/182; 382/298; 382/248; 382/232
(58) Field of Classification Search .................. 382/298, 382/248, 233, 232, 240, 173
See application file for complete search history.

(56) References Cited

U.S. PATENT DOCUMENTS

| | | | |
|---|---|---|---|
| 5,539,841 A | 7/1996 | Huttenlocher et al. | |
| 5,566,003 A * | 10/1996 | Hara et al. ..................... | 358/448 |
| 5,684,891 A | 11/1997 | Tanaka et al. | |
| 5,710,834 A * | 1/1998 | Rhoads .......................... | 382/232 |
| 5,999,647 A | 12/1999 | Nakao et al. | |
| 6,043,823 A * | 3/2000 | Kodaira et al. ............... | 345/619 |
| 6,064,769 A | 5/2000 | Nakao et al. | |
| 6,075,875 A * | 6/2000 | Gu ................................. | 382/107 |
| 6,141,443 A | 10/2000 | Nakao et al. | |
| 6,212,299 B1 | 4/2001 | Yuge | |
| 7,289,671 B2 * | 10/2007 | Kondo et al. ................. | 382/233 |
| 7,787,653 B2 * | 8/2010 | Rhoads .......................... | 382/100 |
| 2002/0186886 A1 * | 12/2002 | Rhoads .......................... | 382/232 |
| 2004/0005093 A1 * | 1/2004 | Rhoads .......................... | 382/232 |
| 2005/0140679 A1 | 6/2005 | Kaneda | |
| 2006/0056695 A1 * | 3/2006 | Wu et al. ....................... | 382/173 |
| 2006/0126953 A1 * | 6/2006 | Kondo et al. ................. | 382/233 |
| 2007/0058873 A1 * | 3/2007 | Kondo et al. ................. | 382/233 |

FOREIGN PATENT DOCUMENTS

| | | |
|---|---|---|
| JP | A 3-186895 | 8/1991 |
| JP | A 5-28301 | 2/1993 |
| JP | A 5-120481 | 5/1993 |
| JP | A 5-143776 | 6/1993 |
| JP | A 5-174185 | 7/1993 |

(Continued)

OTHER PUBLICATIONS

Ian H. Witten et al., "Textual Images," Managing Gigabytes: Compressing and Indexing Documents and Images, Second Edition, Chapter 7, pp. 320-332, 1999.

*Primary Examiner* — Vu Le
*Assistant Examiner* — Aklilu Woldemariam
(74) *Attorney, Agent, or Firm* — Oliff & Berridge, PLC

(57) ABSTRACT

An image processing apparatus includes an extracting unit, a representative-image generating unit and a vector converting unit. The extracting unit extracts pixel blocks from image data. The representative-image generating unit generates representative images from the pixel blocks extracted by the extracting unit, based on a similarity between the pixel blocks. The vector converting unit converts the representative images generated by the representative-image generating unit into vector information.

26 Claims, 30 Drawing Sheets

FOREIGN PATENT DOCUMENTS

| | | |
|---|---|---|
| JP | A 6-44406 | 2/1994 |
| JP | A-6-180771 | 6/1994 |
| JP | A 6-187489 | 7/1994 |
| JP | A 6-348911 | 12/1994 |
| JP | A 7-13994 | 1/1995 |
| JP | A 7-160810 | 6/1995 |
| JP | A 7-200745 | 8/1995 |
| JP | A 8-161432 | 6/1996 |
| JP | A 8-297718 | 11/1996 |
| JP | A 10-69524 | 3/1998 |
| JP | A 10-134145 | 5/1998 |
| JP | A 10-261047 | 9/1998 |
| JP | A 2005-157448 | 6/2005 |
| JP | A-2005-323169 | 11/2005 |
| JP | A 2006-253892 | 9/2006 |

\* cited by examiner

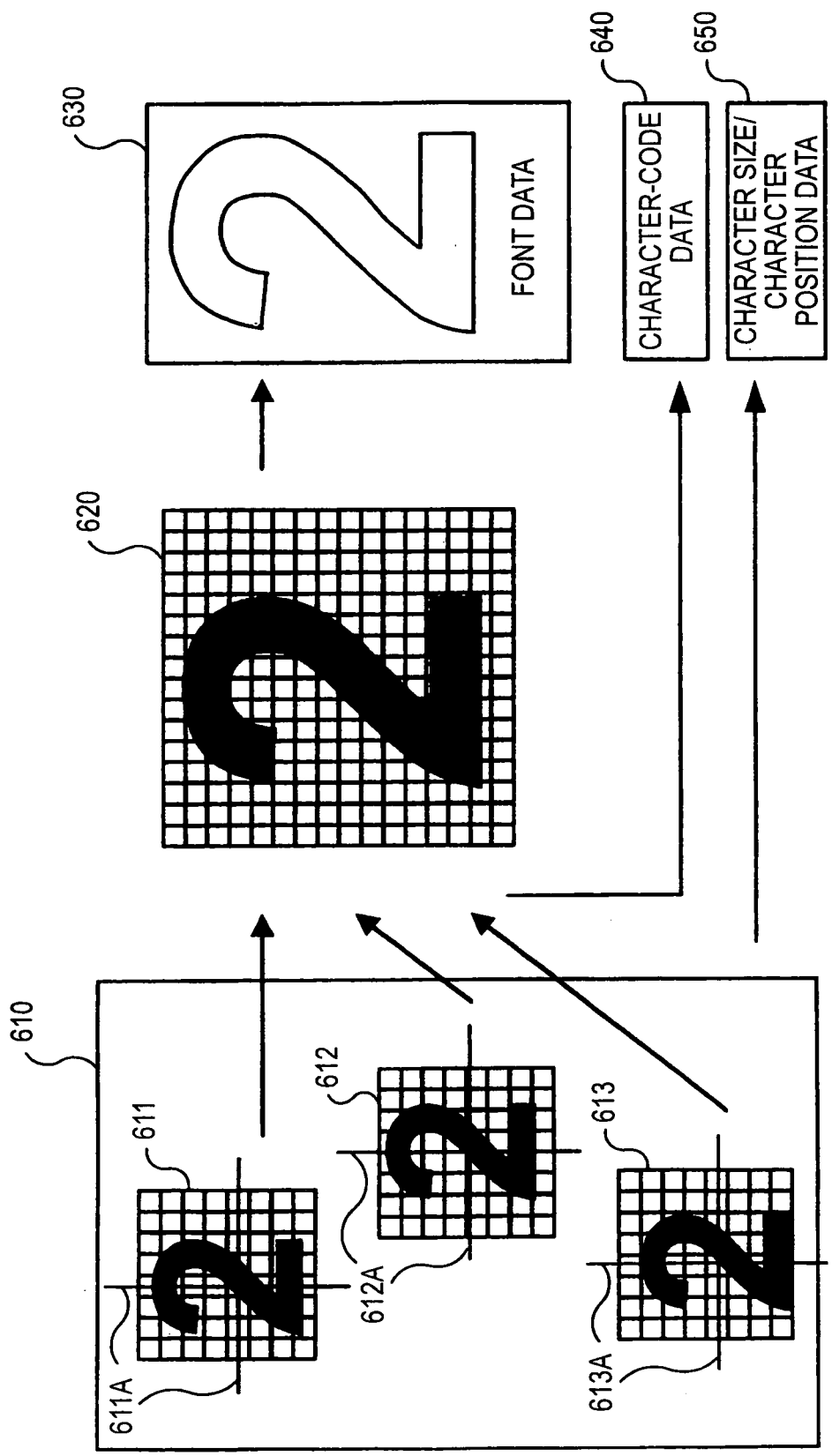

FIG. 16

| FONT CODE | FONT |
|---|---|
| 1 | A |
| 2 | B |
| 3 | C |
| 4 | ff |
| 5 | B |
| 6 | ff |
| 7 | A |
| 8 | ff |

FIG. 17

| FONT CODE | CHARACTER CODE |
|---|---|
| 1 | <A> |
| 2 | <B> |
| 3 | <C> |
| 4 | <f><f> |
| 5 | <B> |
| 6 | <f><f> |
| 7 | <A> |
| 8 | <f><f> |

| FONT CODE | CHARACTER SIZE | CHARACTER POSITION X | CHARACTER POSITION Y |
|---|---|---|---|
| 1 | | | |
| 2 | | | |
| 3 | | | |
| 4 | | | |
| 5 | | | |
| 6 | | | |
| 7 | | | |
| 8 | | | |

1801 / 1802 / 1803 / 1804 / 1800

1900
1901 — FONT FILE
1902 — CORRESPONDENCE TABLE AMONG FONT CODES, CHARACTER SIZES AND POSITIONS
1903 — CORRESPONDENCE TABLE BETWEEN FONT CODES AND CHARACTER CODES

FIG. 25

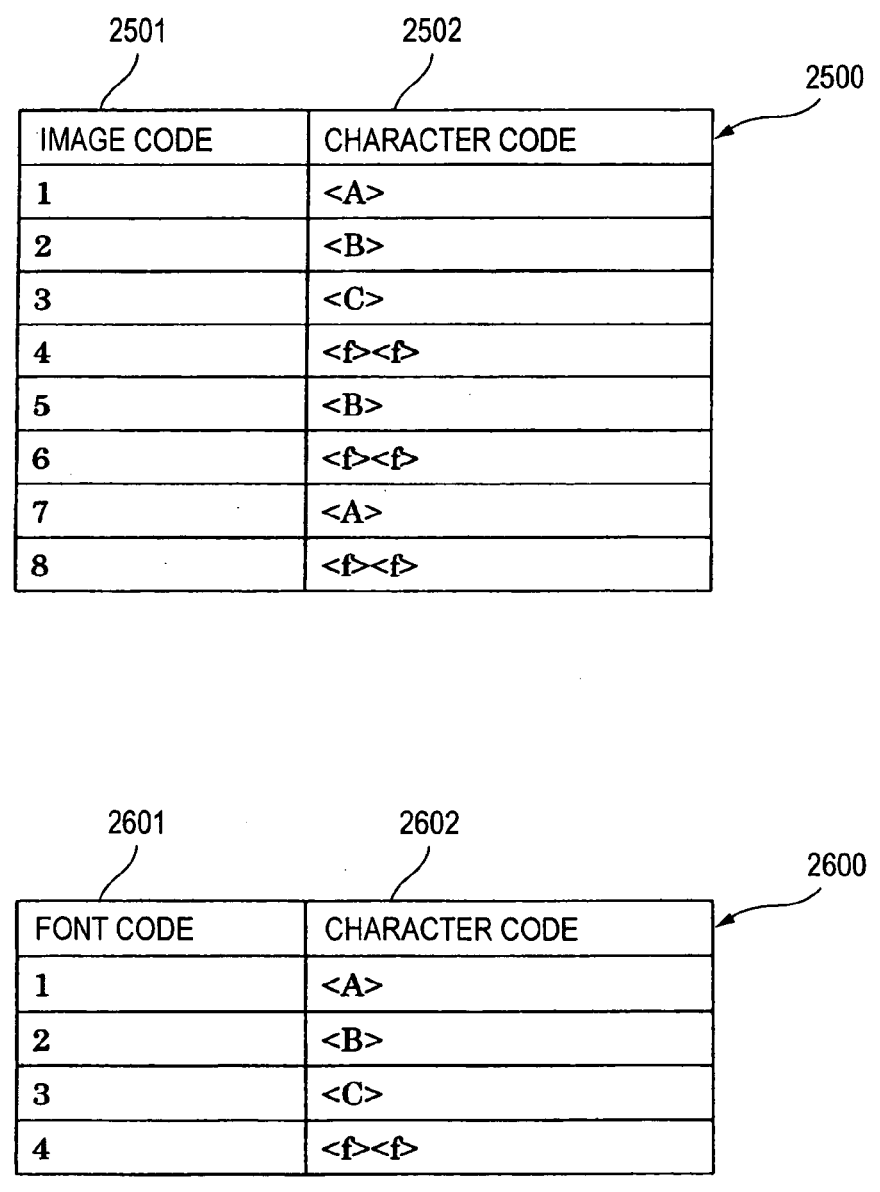

Table 2500:

| IMAGE CODE (2501) | CHARACTER CODE (2502) |
|---|---|
| 1 | <A> |
| 2 | <B> |
| 3 | <C> |
| 4 | <f><f> |
| 5 | <B> |
| 6 | <f><f> |
| 7 | <A> |
| 8 | <f><f> |

FIG. 26

Table 2600:

| FONT CODE (2601) | CHARACTER CODE (2602) |
|---|---|
| 1 | <A> |
| 2 | <B> |
| 3 | <C> |
| 4 | <f><f> |

FIG. 27

| IMAGE CODE | CHARACTER CODE |
|---|---|
| 1 | \<A\> |
| 2 | \<B\> |
| 3 | \<C\> |
| 4 | \<f\>\<f\> |
| 5 | \<B\> |
| 6 | \<U\> |
| 7 | \<A\> |
| 8 | \<f\>\<f\> |

FIG. 28

| IMAGE CODE | FONT CODE |
|---|---|
| 1 | 1 |
| 2 | 2 |
| 3 | 3 |
| 4 | 4 |
| 5 | 2 |
| 6 | 5 |
| 7 | 1 |
| 8 | 4 |

FIG. 29

| FONT CODE | CHARACTER CODE |
|---|---|
| 1 | <A> |
| 2 | <B> |
| 3 | <C> |
| 4 | <f><f> |
| 5 | <U> |

| IMAGE CODE | FONT CODE | CHARACTER SIZE | CHARACTER POSITION X | CHARACTER POSITION Y |
|---|---|---|---|---|
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |

3001, 3002, 3003, 3004, 3005, 3000

IMAGE PROCESSING APPARATUS, IMAGE PROCESSING METHOD AND COMPUTER-READABLE MEDIUM

CROSS-REFERENCE TO RELATED APPLICATIONS

This application is based on and claims priority under 35 U.S.C. §119 from Japanese Patent Application Nos. 2007-41459 (filed on Feb. 21, 2007) and 2007-109002 (filed on Apr. 18, 2007).

BACKGROUND

1. Technical Field

The invention relates to an image processing apparatus, an image processing method and a computer-readable medium storing an image processing program.

2. Related Art

There has been known a technique for converting entire image data or individual character images in the image data into vector information (including outline information).

SUMMARY

According to an aspect of the invention, an image processing apparatus includes an extracting unit, a representative-image generating unit and a vector converting unit. The extracting unit extracts pixel blocks from image data. The representative-image generating unit generates representative images from the pixel blocks extracted by the extracting unit, based on a similarity between the pixel blocks. The vector converting unit converts the representative images generated by the representative-image generating unit into vector information.

BRIEF DESCRIPTION OF THE INVENTION

Exemplary embodiments of the invention will be described in detail below with reference to the accompanying drawings, wherein:

FIG. 6 is an explanatory view showing an example of image process according to the third exemplary embodiment;

FIG. 16 is an explanatory view showing an example of a data structure of font information;

FIG. 17 is an explanatory view showing an example of a data structure of a correspondence table between font codes and character codes;

FIG. 25 is an explanatory view showing an example of a data structure of a correspondence table between image codes and character codes;

FIG. 26 is an explanatory view showing an example of a data structure of a correspondence table between font codes and character codes;

FIG. 27 is an explanatory view showing an example of data in a correspondence table between image codes and character codes;

FIG. 28 is an explanatory view showing an example of data in a conversion table between image codes and font codes;

FIG. 29 is an explanatory view showing an example of data in a correspondence table between font codes and character codes.

FIG. 30 is an explanatory view showing an example of a data structure of a correspondence table among image codes, font codes, character sizes and positions;

DETAILED DESCRIPTION

Hereinafter, exemplary embodiments of the invention will be described with reference to the accompanying drawings.

Figure 1:
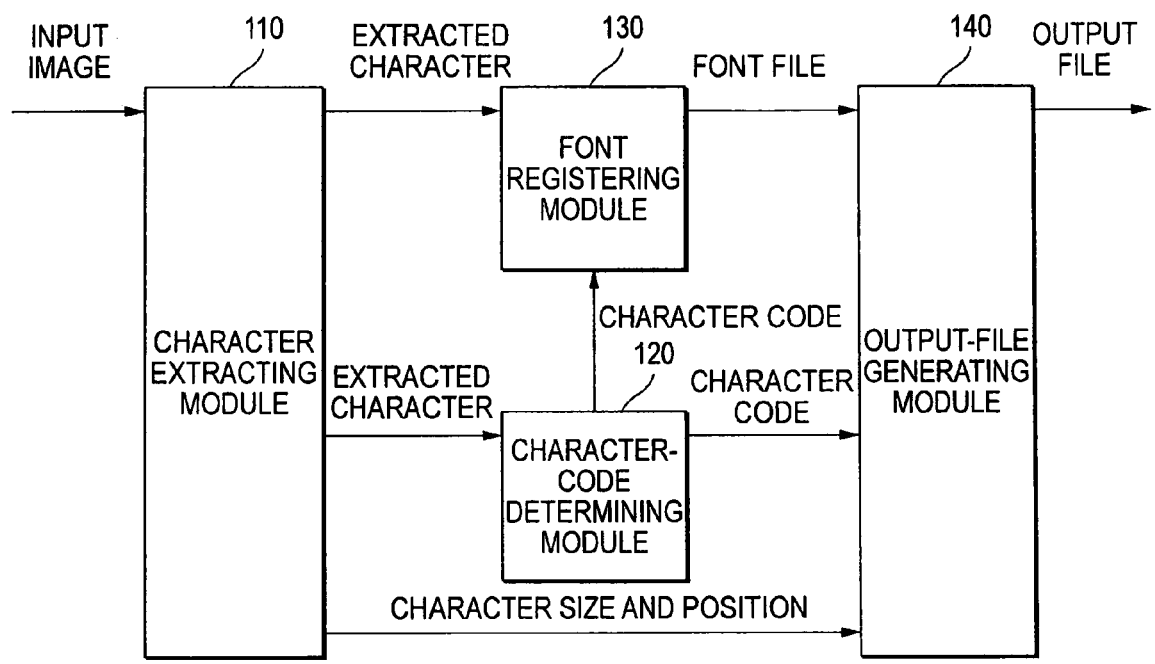
FIG. 1 is a conceptual module configuration diagram of an image processing apparatus according to a first exemplary embodiment.

FIG. 1 is a conceptual module configuration diagram of an image processing apparatus according to a first exemplary embodiment.

Modules used herein generally refer to parts, such as software, hardware and the like, which can be logically separated. Accordingly, modules in the exemplary embodiments include not only program modules but also hardware modules. Therefore, the exemplary embodiments include description about programs, systems and methods. Also, although modules have a one-to-one correspondence relation with their functions, for implementation, one module may be configured by one program, plural modules may be configured by one program, or one module may be configured by plural programs. Also, plural modules may be executed by one computer, or one module may be executed by plural computers in distributed or parallel environments. Also, different modules may be included in one module. Hereinafter, "connection" includes logical connection (data exchange, instructions, etc.) as well as physical connection.

Also, a system includes not only plural computers, hardware, devices and so on interconnected by a communication device such as a network but also a single computer, hardware, device and so on.

Image data refer to data in which an image is represented by arranging dots having values and may be called a bitmap image or a raster image. The image data may be compressed or encrypted, but does not include vector information or outline information. A file format in which the image data are stored includes BMP (BitMap), TIFF (Tagged Image File Format), PNG (Portable Network Graphics), JPEG/JPEG2000 (Joint Photographic Experts Group), GIF (Graphics Interchange Format), etc. Also, the image data handled in the exemplary embodiments may be one image or plural pieces of image data.

A pixel block includes at least a pixel region in which pixels are consecutive in 4-connectivity or 8-connectivity, and also includes a set of such pixel regions. The set of pixel regions may include plural pixel regions in which pixels are consecutive in 4-connectivity or the like, and the plural pixel regions are neighboring pixel regions. Here, the neighboring pixel regions may be ones which are closed to each other in distance, image regions which are vertically or horizontally projected character by character in one row of a sentence and cut out at a blank spot, or image regions cut out in predetermined intervals, etc.

In many cases, one pixel block corresponds to an image of one character. However, it is not necessary that one pixel block is a pixel region that a human actually can recognize as a character. Some pixel region has a part or none of a character and may be any pixel block no matter what it is. Hereinafter, "character" or "character image" is intended to use as meaning a "pixel block," unless describe otherwise.

Vectorizing includes outlining. Outlining refers to a method for approximating a contour shape of a character image to a curve such as a Bezier curve. An example of this method may include the technique described in disclosed in JP 2006-253892 A. Vectorizing refers to representing not only a character image but also an image of a pixel block with drawing information such as equations (including algorithms and the like) of straight lines, circular arcs, Bezier curves, faces, filling and so on. Hereinafter, outlining is used as an example of the vectorizing, but another vectorizing may be used.

Also, a font code is used as an example of a first code, an image code is used as an example of a second code, and a character code is used as a third code. Also, a font file is used as an example of association information that associates the pixel block with the first code.

A file refers to a set of information which have names and are stored or processed as one unit. For example, a file may be a unit of a bundle of programs or data processed by an OS (Operating System) or application software.

In this exemplary embodiment, as shown in FIG. 1, an image processing apparatus includes a character extracting module 110, a character-code determining module 120, a font registering module 130 and an output-file generating module 140.

As shown in FIG. 1, the character extracting module 110 is connected to the character-code determining module 120, the font registering module 130 and the output-file generating module 140 and extracts character images (pixel blocks) from an input image. The character extracting module 110 transmits the extracted character images to the character-code determining module 120 and the font registering module 130 and transmits a character size of each extracted character image and a position of each extracted character image in the input image to the output-file generating module 140.

As shown in FIG. 1, the character-code determining module 120 is connected to the character extracting module 110, the font registering module 130 and the output-file generating module 140 and assigns (determines), to each character image extracted by the character extracting module 110, a character code that uniquely identifies each extracted character image. Any assignment method may be used so long as each assigned code uniquely identifies the corresponding character image in the input image. For example, the character codes may be assigned in order of an appearance frequency. However, if a result of process in this exemplary embodiment is used in character processing software such as a word processor, an escape code or the like may not to be assigned. Also, a character code such as JIS (Japanese Industrial Standards) code may be assigned after character recognition is performed, or an extended character code that is a character shape excluded from a character code system in consideration may be assigned. It is noted that accuracy of the character recognition does not depend on reproduction of the input image.

The assigned character codes are transmitted to the font registering module 130 and the output-file generating module 140.

As shown in FIG. 1, the font registering module 130 is connected to the character extracting module 110, the character-code determining module 120 and the output-file generating module 140 and associates each character image extracted by the character extracting module 110 with the corresponding character code assigned by the character-code determining module 120. That is, the character images corresponding to the respective character codes are registered in a font file format (prepared as a font file). In other words, respective fonts can be later referred to using the character codes, and an original image can be reproduced when a character code, a character position and a character size are specified. The character images may be outlined and registered as outline fonts or may be registered as bitmap fonts as they are. The registered font file is transmitted to the output-file generating module 140.

As shown in FIG. 1, the output-file generating module 140 is connected to the character extracting module 110, the character-code determining module 120 and the font registering module 130, receives the character sizes and positions of the character images extracted by the character extracting module 110, the character codes determined by the character-code determining module 120 and the font file registered by the font registering module 130 and bringing them into one file (generate one file based on them). Thus generated file may be encoded.

Also, the character sizes and positions are not required for all of character codes. If the character sizes and positions can be relatively determined, only a required portion may be specified. For example, if the character size is not changed, it may be first specified once. If a Y coordinate is not changed, only an X coordinate may be specified. If the size of the font is fixed, it is not necessary to specify the size.

The generated file in the output-file generating module 140 is output as an output file. A format of the output file may be any one so long as it can contain font information, for example, PDF (Portable Document Format; registered trademark) may be used.

Figure 2:
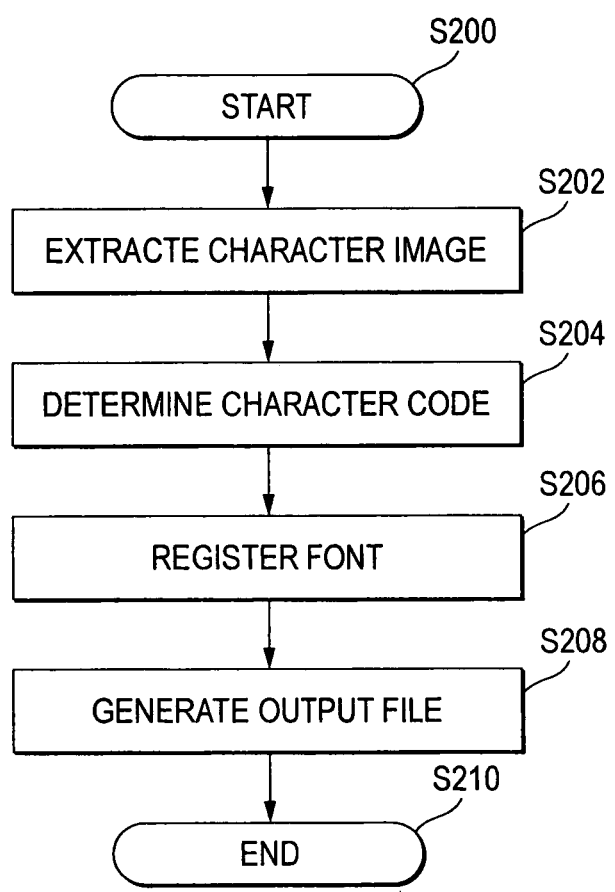
FIG. 2 is a flow chart showing an image processing method according to the first exemplary embodiment.

Next, operation and action of the modules of the image processing apparatus according to the first exemplary embodiment will be described. An image processing method according to the first exemplary embodiment will be described with reference to a flow chart shown in FIG. 2.

In step S202, the character extracting module 110 extracts all character images from an input image and extracts character sizes and positions of the character images.

In step S204, the character-code determining module 120 assigns character codes to the respective character images extracted in step S202.

In step S206, the font registering module 130 generates a font file by associating the character images extracted in step S202 and the character codes assigned in step S204.

In step S208, the output-file generating module 140 bringing the character sizes and positions extracted in step S202, the character codes assigned in step S203 and the font file generated in step S206 together to generate an output file.

Also, although all the character images are extracted in step S202, one character image may be extracted and then processes in steps S204 to S208 may be performed. In this case, steps S202 to S208 are repeatedly performed.

Figure 3:
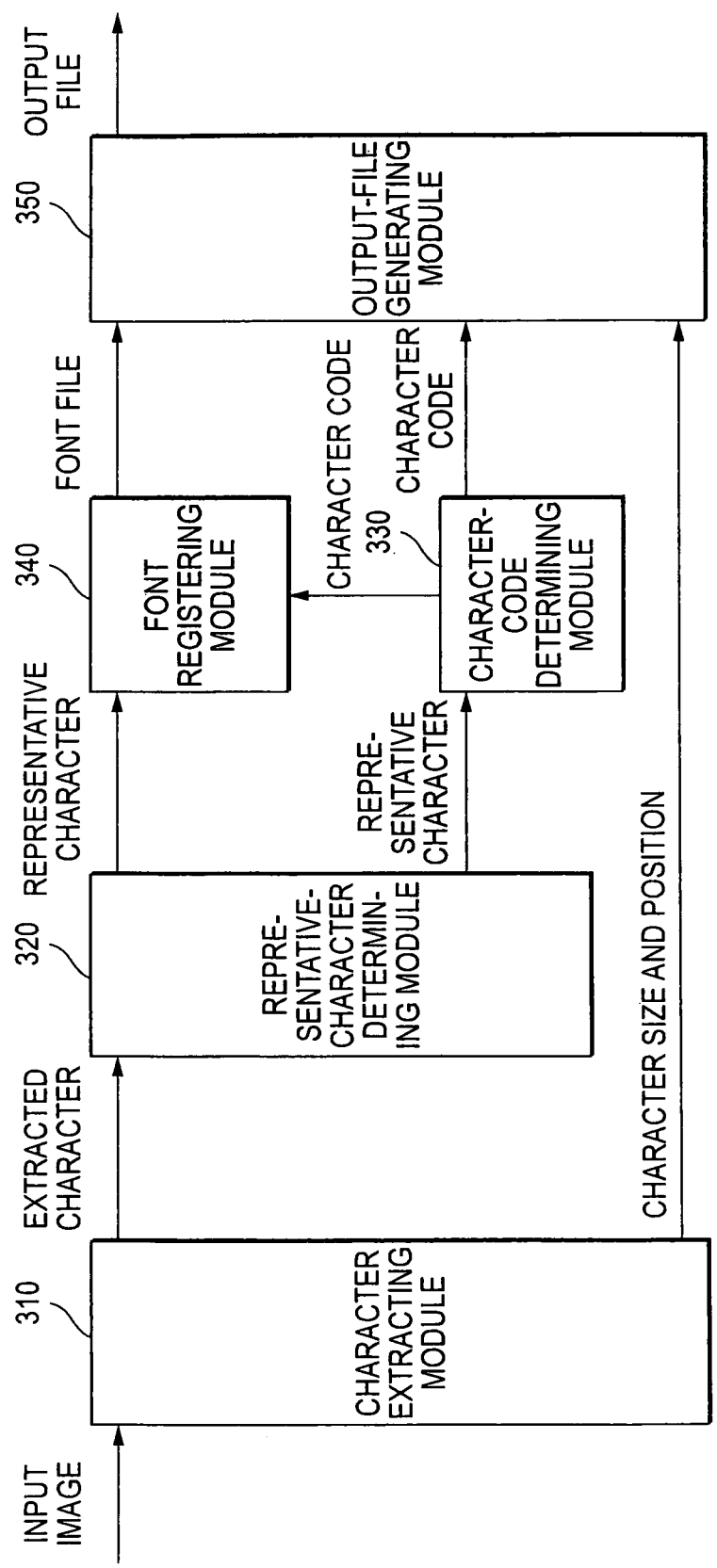
FIG. 3 is a conceptual module configuration diagram of an image processing apparatus according to a second exemplary embodiment.

FIG. 3 is a conceptual module configuration diagram of an image processing apparatus according to a second exemplary embodiment. In the second exemplary embodiment, a representative-character determining module 320 is added to the configuration of the first exemplary embodiment.

As shown in FIG. 3, a character extracting module 310 is connected to a representative-character determining module 320 and an output-file generating module 350. The character extracting module 310 has the same function as the character extracting module 110 of the first exemplary embodiment, transmits extracted character images to the representative-character determining module 320, and transmits character sizes of the extracted character images and positions of the extracted character images in an input image to the output-file generating module 350.

As shown in FIG. 3, the representative-character determining module 320 is connected to the character extracting module 310, a character-code determining module 330 and a font registering module 340. The representative-character determining module 320 compares the character images extracted by the character extracting module 310 with each other to collect character images having a similar shape.

An example of a method for examining similarity between characters to determine a representative character will be described below:

(1) Input two binary images that are extracted character images.

(2) Align centers of gravity of black pixels of the two input binary image.

(3) Perform XOR (eXclusive OR) operation for the two input binary image having the aligned the centers of gravity.

(4) Count the number of pixels (different pixels) which have 1 in logical value as a result of the XOR operation. If the number of pixels is less than a threshold value, determine that the two binary images are similar character images.

(5) Calculate similarities between the extracted character image and the other character images using the above method, and bring similar character images together sequentially.

(6) Standardize the similar character images to generate a representative character.

That is, by generating the representative character, the character images which are parts of image data in the input image are standardized. Specifically, standardizing the character image may include generating one common representative character from plural character images, selecting one character image as a representative character from plural character images or the like.

Accordingly, for example, the representative character may be a character image generated by calculating an average value of similar character images and binarizing the calculated average value, one selected from similar character images, or the like.

Also, whether or not character images are similar may be determined by clustering the extracted character images treated as one vector data and extracting character images similar to a character image in question from the extracted character images. In this case, if a distance between vector data representing the character image in question and vector data representing a target character image (for example, an Euclid distance, etc.) is less than a predetermined value (that is, if a distance between two pieces of vector data is small), it is determined that the character image in question and the target character image are similar to each other.

Also, an expanded image may be generated based on a resultant image of logical operation performed for two character image patterns, and similarity may be determined based on a ratio of overlap with the expanded image. That is, the similarity may be determined depending on a degree of expansion (expansion radius) in perfect concord.

Also, methods described in JP Hei.7-200745 A (corresponding to U.S. Pat. No. 5,539,841), "Managing Gigagytes" Morgan Kaufmmann Publishers pp. 320-332 which are authored by I. H. Witten, A. Mofat, and T. C. Bell, etc. may be used.

Similarity refers to an amount that becomes the maximum if two images are congruent and that decreases depending on a degree of difference therebetween.

Instead of the similarity, an amount that becomes the minimum if two images are congruent and that increases depending on a degree of difference therebetween may be used. In this case, this amount is called "distance" or "dissimilarity." "Distance" refers to a gap between images in a space where the images are placed when the images are represented by vectors (for example, when pixel values are represented by vectors, features of images are represented by vectors, etc.). For example, this distance may include an Euclid distance, a Manhattan distance, a Hausdorff distance, a Mahalanobis distance, angle θ between vectors, cos θ, the square of cos θ or the like.

As shown in FIG. 3, the character-code determining module 330 is connected to the representative-character determining module 320, the font registering module 340 and the output-file generating module 350 and has the same function as the character-code determining module 120 of the first exemplary embodiment except that input character images are the representative characters generated by the representative-character determining module 320. It is noted that the character-code determining module 330 assigns a character code (this assigning includes recognizing characters) only to each representative character of similar character images. That is, the same character code is assigned to the similar character images.

As shown in FIG. 3, the font registering module 340 is connected to the representative-character determining module 320, the character-code determining module 330 and the output-file generating module 350 and has the same function as the font registering module 130 of the first exemplary embodiment except that input character images are the representative characters generated by the representative-character determining module 320. It is noted that the font registering module 340 assigns one character code to similar character images (a character image that appears in the input character image plural times), and one font corresponds to the one character code.

As shown in FIG. 3, the output file forming 350 is connected to the character extracting module 310, the character-code determining module 330 and the font registering module 340 and has the same function as the output-file generating module 140 of the first exemplary embodiment. It is noted that one font corresponds to similar character images. Accordingly, if an original image (input image) is reproduced using an output file generated by the output-file generating module 350, the original image is drawn by referring to one font plural times (equal to the number of times a similar character image appears in the input character image).

Figure 4:
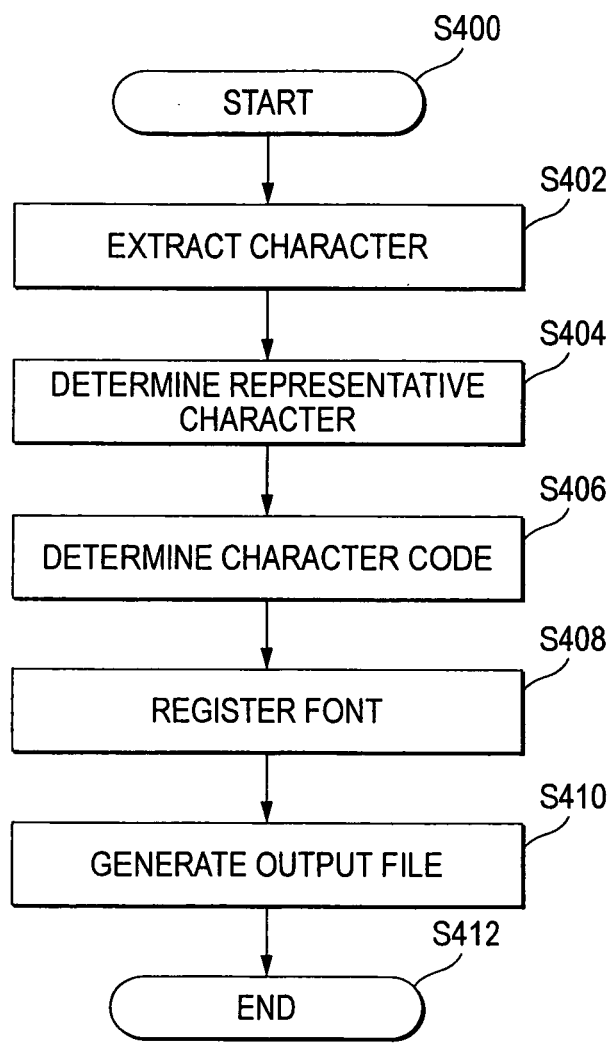
FIG. 4 is a flow chart showing an image processing method according to the second exemplary embodiment.

Next, operation and action of the modules of the image processing apparatus according to the second exemplary embodiment will be described. An image processing method according to the second exemplary embodiment will be described with reference to a flow chart shown in FIG. 4.

In step S402, the character extracting module 310 extracts all character images from an input image and extracts character sizes and positions of the character images.

In step S404, the representative-character determining module 320 determines representative characters from the character images extracted in step 402.

In step S406, the character-code determining module 330 assigns a character code to each representative character determined in step S404.

In step S408, the font registering module 340 generates a font file by associating the representative characters determined in step S404 and the character codes assigned in step S406.

In step S410, the output-file generating module 350 brings the character sizes and positions extracted in step S402, the character codes assigned in step S406 and the font file generated in step S408 together to generate the output file.

Figure 5:
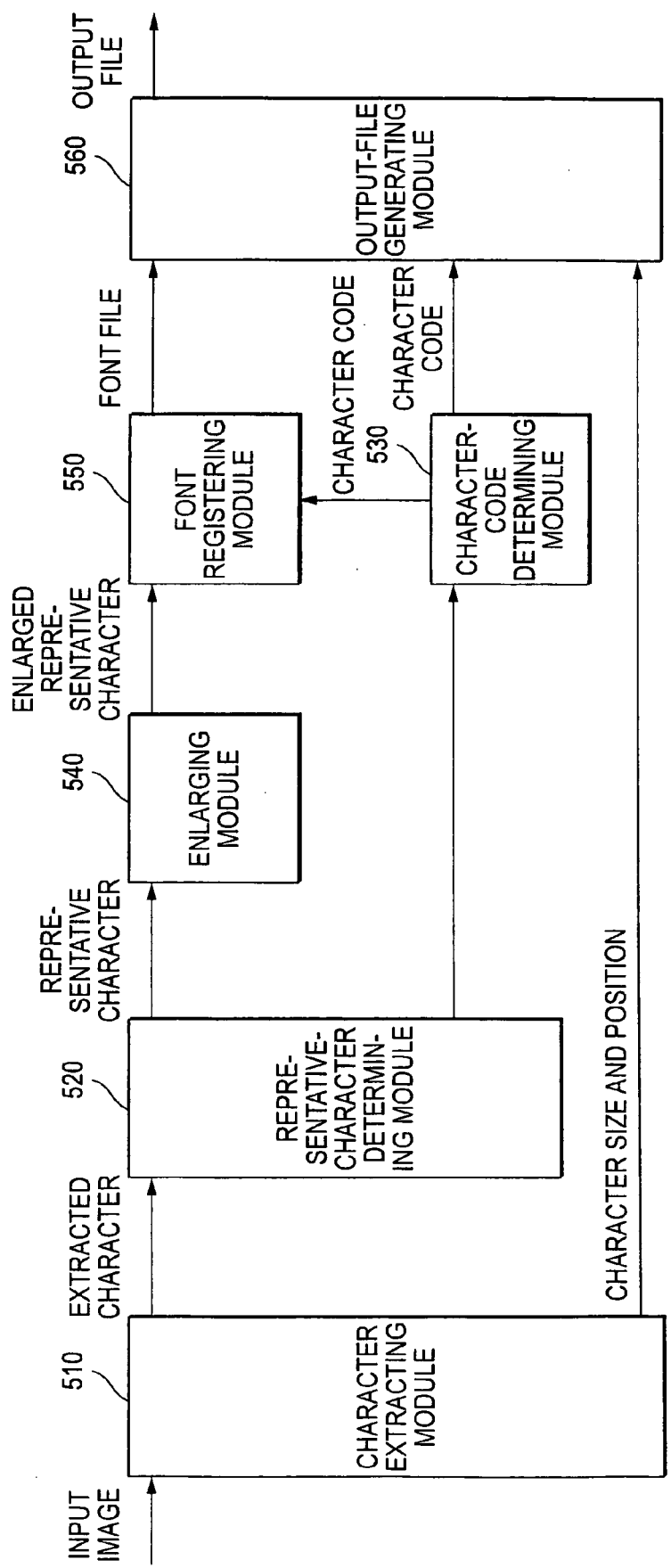
FIG. 5 is a conceptual module configuration diagram of an image processing apparatus according to a third exemplary embodiment.

FIG. 5 is a conceptual module configuration diagram of an image processing apparatus according to a third exemplary embodiment. In the third exemplary embodiment, an enlarging module 540 is added to the configuration of the second exemplary embodiment.

As shown in FIG. 5, a character extracting module 510 is connected to a representative-character determining module 520 and an output-file generating module 560 and has the same function as the character extracting module 310 of the second exemplary embodiment.

As shown in FIG. 5, the representative-character determining module 520 is connected to the character extracting module 510, a character-code determining module 530 and the enlarging module 540 and has the same function as the representative-character determining module 320 of the second exemplary embodiment except that the determined representative characters are transmitted to the enlarging module 540.

As shown in FIG. 5, the enlarging module 540 is connected to the representative-character determining module 520 and a font registering module 550, receives the representative characters determined by the representative character determining module 520 and enlarges the representative characters (that is, generates character images having a higher resolution). That is, the entire input image is not enlarged, but the representative characters determined by the representative-character determining module 520 are enlarged. A method of enlarging the representative characters will be described later with reference to FIG. 7.

As shown in FIG. 5, the character-code determining module 530 is connected to the representative-character determining module 520, the font registering module 550 and the output-file generating module 560 and has the same function as the character-code determining module 330 of the second exemplary embodiment.

As shown in FIG. 5, the font registering module 550 is connected to the character-code determining module 530, the enlarging module 540 and the output-file generating module 560 and has the same function as the font registering module 340 of the second exemplary embodiment except that the input character images are the representative characters enlarged by the enlarging module 540.

Also, the font registering module 550 may perform the following processes:

There may be a case where the same character code is assigned to different representative characters by the character-code determining module 530 (particularly in a case where character recognition is performed). In this case, the different representative characters may be registered as different font species.

That is, the following processes are performed:

(1) Register font species X (X=0, 1, 2, . . . ).

(2) Perform character recognition for a representative character and it is assumed that a character code is Y. Register the representative character having the character code Y in the font species X. It is also assumed that this font species X has the smallest value of X among the font species X in which the character code Y is not registered.

(2-1) That is, if the character code Y appears first, the character code Y is registered in a font species 0.

(2-2) If the character code Y is registered in font species 0, 1, . . . , N−1, the character code Y is registered in a font species N.

As shown in FIG. 5, the output-file generating module 560 is connected to the character extracting module 510, the character-code determining module 530 and the font registering module 550 and has the same function as the output-file generating module 350 of the second exemplary embodiment.

Now, a process example of the third exemplary embodiment will be described with reference to FIG. 6.

The character extracting module 510 sets an input image 610 having several characters "2" as a target image. As shown in FIG. 6, the character extracting module 510 extracts a character image 611, a character image 612 and a character image 613 from the input image 610 at resolution of the character image 611. Then, the character extracting module 510 extracts character size/character position data 650 from the input image 610.

The representative-character determining module 520 determines that these character images of "2" are similar to each other.

The character-code determining module 530 assigns character-code data 640 to the character images of "2."

The enlarging module 540 obtains centers of gravity of the character image 611, the character image 612 and the character image 613 (intersecting points between central lines 611A and so on) and moves phases so that the centers of gravity coincide with each other, to generates a high-resolution character image 620.

The font registering module 550 generates font data 630 as outline information from the high-resolution character image 620.

The output-file generating module 560 generates the output file from the font data 630, the character-code data 640 and the character size/character position data 650.

An example of a process performed by the enlarging module 540 will be described with reference to FIG. 7.

Figure 7A:
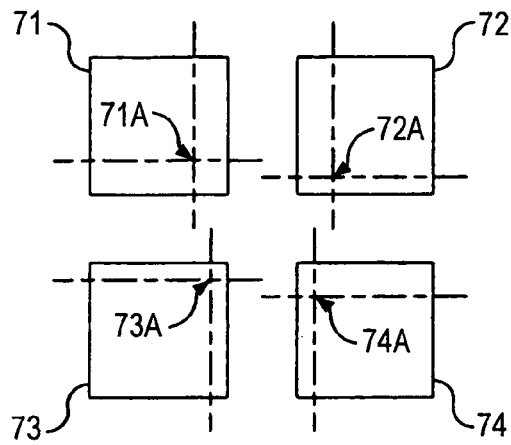
FIG. 7 is an explanatory view showing an example of a process of generating high-resolution character image data by an enlarging module.

FIG. 7(A) shows sampling lattices (first sampling lattices 71, 72, 73 and 74) and center-of-gravity positions of character images (centers of gravity 71A, 72A, 73A and 74A) at a resolution (first resolution) of the input image 610.

Figure 7B:
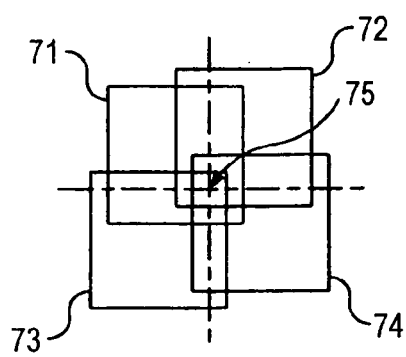

As shown in FIG. 7(B), first, the enlarging module 540 moves phases of the four sampling lattices based on the centers of gravity of the character images.

Figure 7C:
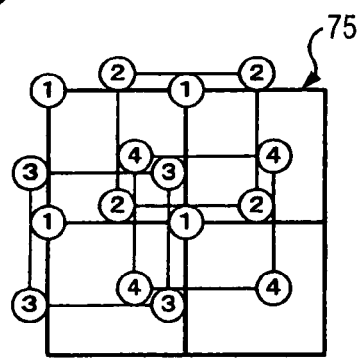
Figure 7D:
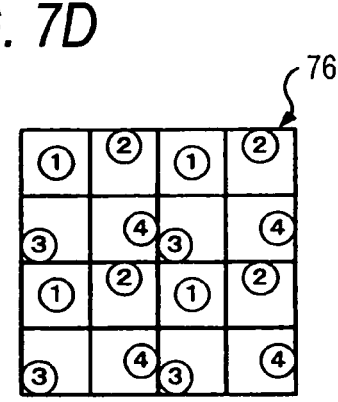

FIGS. 7(C) and 7(D) are views illustrating an example of a method for setting sampling lattices having a second resolution higher than the first resolution. Circled numbers (1, 2, 3 and 4) shown in FIG. 7(C) exemplify values of the character images at the first resolution. Here, the character images are plotted such that the circled numbers are indicated on lattice points of the sampling lattices at the first resolution.

In FIG. 7(D), second sampling lattices 76 are sampling lattices of a high resolution image.

When the phases of the four sampling lattices at the first resolution are moved, the enlarging module 540 sets the sampling lattices at the second resolution as shown in FIG. 7(C), and moves phases of the sampling lattices at the second resolution so that the centers of gravity of the character images coincide with each other.

Figure 7E:
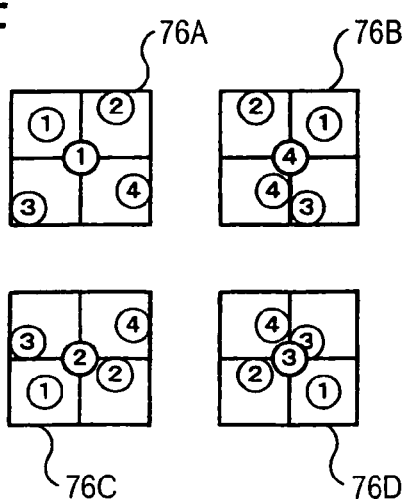

FIG. 7(E) is a view illustrating an example of a method for calculating values of the character images at the second resolution. Circled numbers at centers of second sampling lattices 76A, 76B, 76C and 76D exemplify values of the character images at the second resolution. Here, the character images at the second resolution are shown such that the circled numbers at the centers of the character images are indicated on lattice points of the sampling lattices at the second resolution.

Also, the enlarging module 540 interpolates pixel values of the character images at the second resolution from the pixel values of the respective character images based on the phases of the respective character images at the first resolution. In this example, the enlarging module 540 interpolates the pixel values of the character images at the second resolution by applying a nearest neighbor interpolation method. That is, the enlarging module 540 selects a value nearest to each sampling lattice point at the second resolution from among the four values (circled numbers 1, 2, 3 and 4 in FIG. 7(E)) of the character images at the first resolution, and sets the selected value to a value of each character image at the second resolution. Specifically, a value nearest to the center in the second sampling lattice 78A is "1" which is set to be a value of the character image at the second resolution (a circled number is 1). Also, the interpolation method is not limited to the above method, but may be applied with any other methods (for example, a linear interpolation method or the like).

Also, the process performed by the enlarging module 540 is not limited to the above-described process, but may be linear interpolation, cubic convolution or the like.

Figure 8:
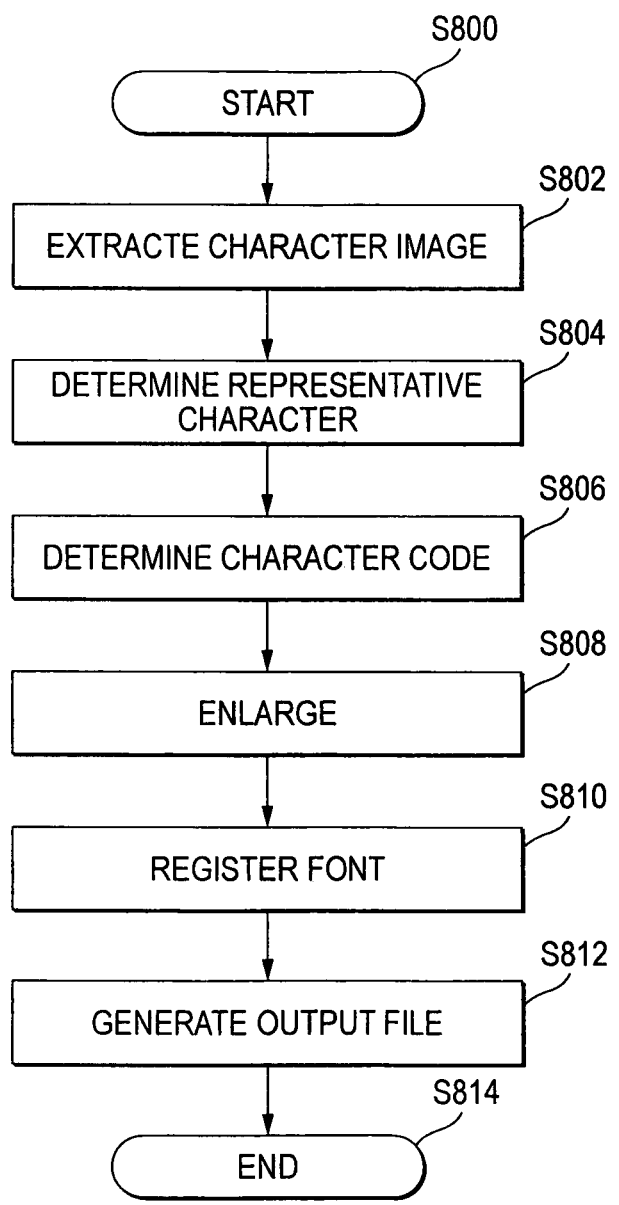
FIG. 8 is a flow chart showing an image processing method according to the third exemplary embodiment.

Next, operation and action of the modules of the image processing apparatus according to the third exemplary embodiment will be described. An image processing method according to the second exemplary embodiment will be described with reference to a flow chart shown in FIG. 8.

In step S802, the character extracting module 510 extracts all character images from an input image and extracts character sizes and positions of the character images.

In step S804, the representative-character determining module 520 determines representative characters from the character images extracted in step 802.

In step S806, the character-code determining module 530 assigns a character code to each representative character determined in step S804.

In step S808, the enlarging module 540 enlarges the representative characters determined in step S804.

In step S810, the font registering module 550 generates a font file by associating the representative characters enlarged in step S808 and the character codes assigned in step S806.

In step S812, the output-file generating module 560 brings the character sizes and positions extracted in step S802, the character codes assigned in step S806 and the font file generated in step S810 together to generate an output file.

Figure 9:
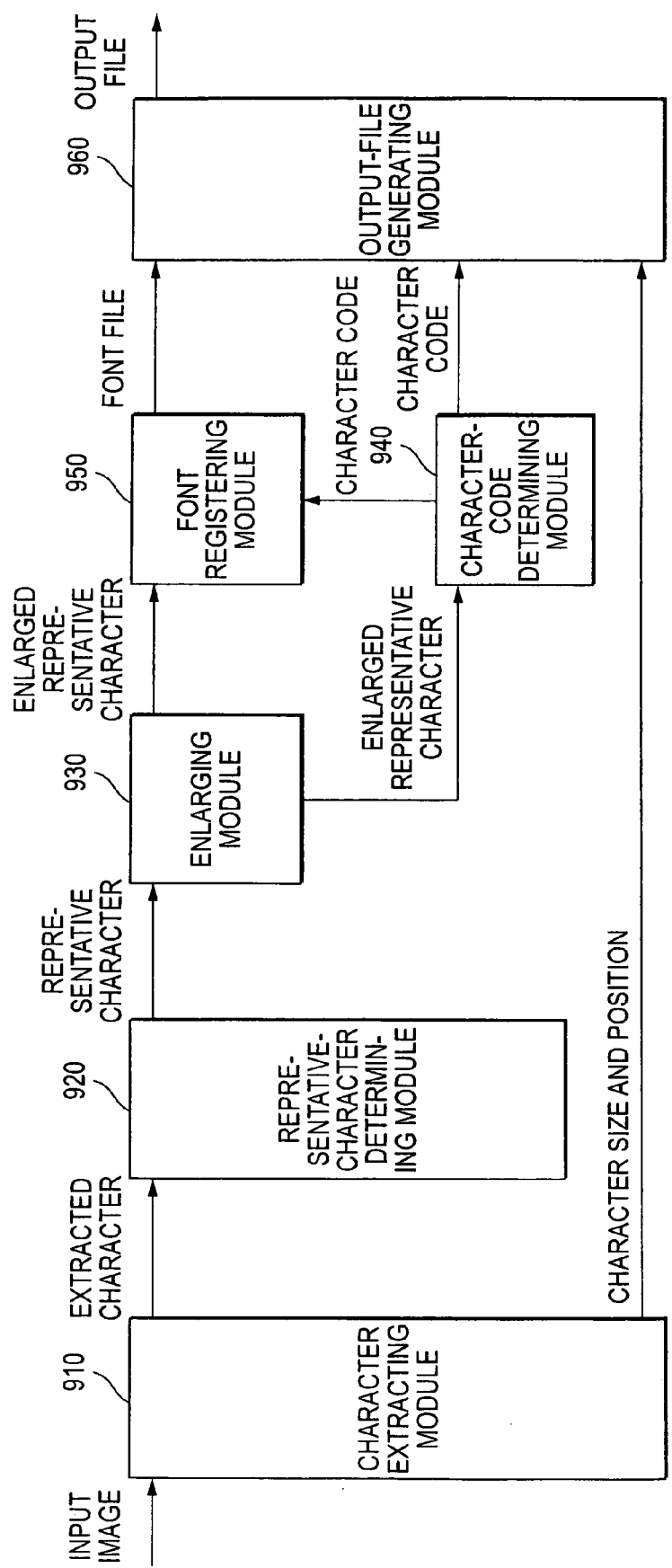
FIG. 9 is a conceptual module configuration diagram of an image processing apparatus according to a fourth exemplary embodiment.

FIG. 9 is a conceptual module configuration diagram of an image processing apparatus according to a fourth exemplary embodiment. The fourth exemplary embodiment is different from the second exemplary embodiment in that a character-code determining module 940 of the fourth exemplary embodiment determines a character code for each enlarged representative character.

As shown in FIG. 9, a character extracting module 910 is connected to a representative-character determining module 920 and an output-file generating module 960 and has the same function as the character extracting module 510 of the third exemplary embodiment.

As shown in FIG. 9, the representative-character determining module 920 is connected to the character extracting module 910 and an enlarging module 930 and has the same function as the representative-character determining module 520 of the third exemplary embodiment except that the representative characters are transmitted only to the enlarging module 930.

As shown in FIG. 9, the enlarging module 930 is connected to the representative-character determining module 920, the character-code determining module 940 and a font registering module 950 and has the same function as the enlarging module 540 except that the enlarged representative characters are also transmitted to the character-code determining module 940.

As shown in FIG. 9, the character-code determining module 940 is connected to the enlarging module 930, the font registering module 950 and the output-file generating module 960, receives the representative characters enlarged by the enlarging module 930 and assigns a character code to each enlarged representative character. The enlarged representative characters are processed to have a higher resolution, and, for example, character recognition having less error may be performed as a process of assigning character codes. Also, the character codes are transmitted to the font registering module 950 and the output-file generating module 960.

As shown in FIG. 9, the font registering module 950 is connected to the enlarging module 930, the character-code determining module 940 and the output-file generating module 960 and has the same function as the font registering module 550 of the third exemplary embodiment.

As shown in FIG. 9, the output-file generating module 960 is connected to the character extracting module 910, the character-code determining module 940 and the font registering module 950 and has the same function as the output-file generating module 560 of the third exemplary embodiment.

Figure 10:
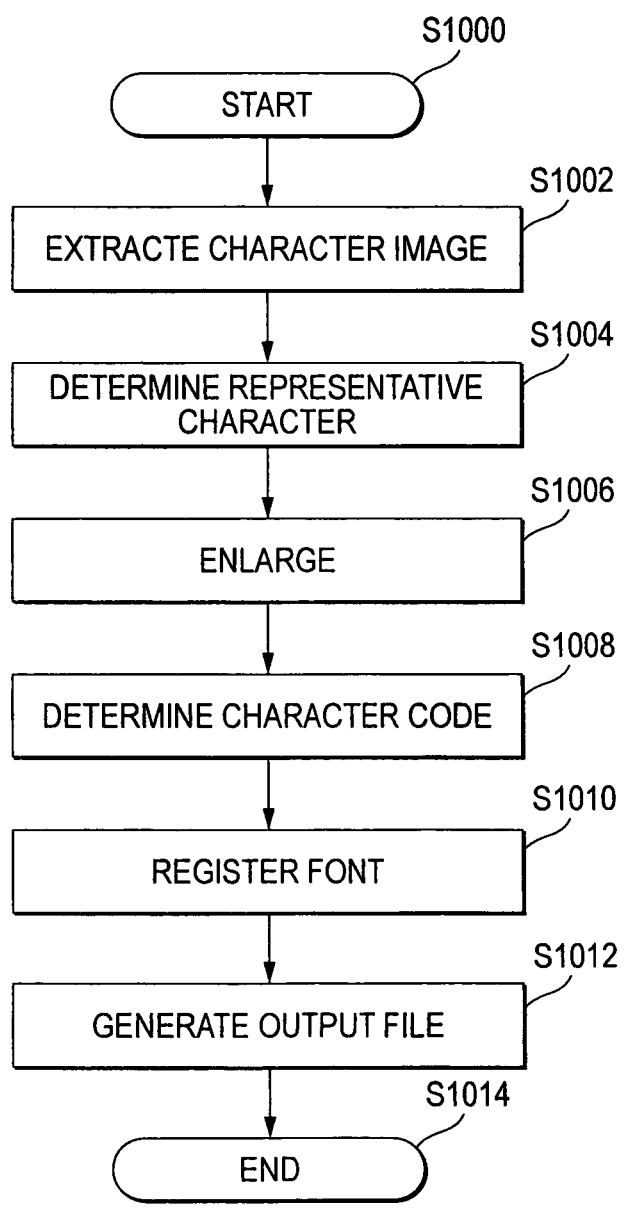
FIG. 10 is a flow chart showing an image processing method according to the fourth exemplary embodiment.

Next, operation and action of the modules of the image processing apparatus according to the fourth exemplary embodiment will be described. An image processing method according to the fourth exemplary embodiment will be described with reference to a flow chart shown in FIG. 10.

In step S1002, the character extracting module 910 extracts all character images from the input image and extracts character sizes and positions of the character images.

In step S1004, the representative-character determining module 920 determines representative characters from the character images extracted in step 1002.

In step S1006, the enlarging module 930 enlarges the representative characters determined in step S1004.

In step S1008, the character-code determining module 940 assigns a character code to each representative character expanded in step S1006.

In step S1010, the font registering module 950 generates a font file by associating the representative characters enlarged in step S1006 and the character codes assigned in step S1008.

In step S1012, the output-file generating module 960 brings the character sizes and positions extracted in step S1002, the character codes assigned in step S1008 and the font file generated in step S1010 together, to generate an output file.

Next, fifth to seventh exemplary embodiment of the invention will be described.

In the above first to fourth exemplary embodiments, the character images are extracted and then, the character codes are assigned to the respective extracted character images one by one.

However, there may be a case where two or more character codes are assigned to an extracted character image due to a method of extracting character images or image features of characters. That is, the first to fourth exemplary embodiments may not address the case where two or more character codes corresponding to one extracted character image.

Accordingly, the fifth to seventh exemplary embodiments are configured so as to be able to address the case where two or more character codes are to correspond to one extracted image.

In the fifth to seventh exemplary embodiments, extracting of characters is also performed for character recognition.

As methods of extracting characters that are also performed for character recognition, there have been proposed various methods. For example, methods of extracting characters that may be employed here include methods described in JP Hei.6-44406 A (corresponding to U.S. Pat. No. 5,684,891), JP Hei.6-187489 A, JP Hei.6-348911 A, JP Hei.7-13994 A, JP Hei.7-160810, JP Hei.8-161432 A, JP Hei.8-297718 A (corresponding to U.S. Pat. Nos. 5,999,647, 6,064,769 and 6,141,443), JP Hei.10-69524 A, JP Hei.10-134145 A and JP Hei.10-261047 A as well as the methods described in JP Hei.5-28301 A, JP Hei.5-120481 A, JP Hei.5-143776 A and JP Hei.5-174185 A.

After extracting the characters, the character recognition is performed for the extracted characters. The character recognition may be independently performed for each of the extracted characters. Alternatively, the character recognition may be performed using plural extracted images to use character string information.

Figures 11, 12:
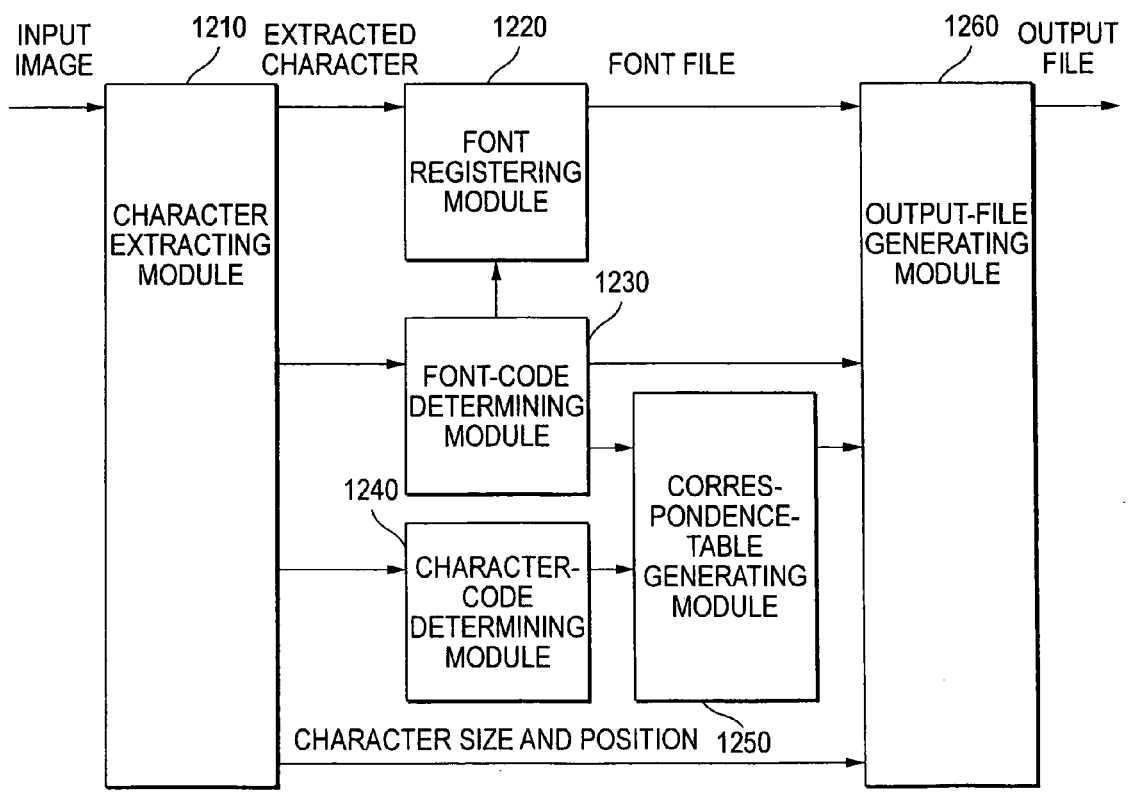
FIG. 11 is an explanatory view showing an example of a result of character extracting processing.
FIG. 12 is a conceptual module configuration diagram of an image processing apparatus according to a fifth exemplary embodiment.

FIG. 11 shows an example of a result of the character extracting process. As shown in FIG. 11, in a normal case such as "A," "B" and "C," one rectangle can be associated with one character.

However, there are some cases, such as "ff," where it is difficult to segment characters into respective rectangles and plural characters are present in one rectangle.

The fifth to seventh exemplary embodiments are provided to deal with such cases.

FIG. 12 is a conceptual module configuration diagram of an image processing apparatus according to the fifth exemplary embodiment. In the fifth exemplary embodiment, as shown in FIG. 12, the image processing apparatus includes a character extracting module 1210, a font registering module 1220, a font-code determining module 1230, a character-code determining module 1240, a correspondence-table generating module 1250 and an output-file generating module 1260.

The character extracting module 1210 is connected to the font registering module 1220, the font-code determining module 1230, the character-code determining module 1240 and the output-file generating module 1260. The character extracting module 1210 has the same function as the character extracting module 110 of the first exemplary embodiment. The above method of extracting out characters may be used in the character extracting module 1210. That is, the character extracting module 1210 extracts character images from an input image and extracts positions of the extracted character images. Also, the character extracting module 1210 may extract sizes (character sizes) of the extracted character images. Also, the character extracting module 1210 may assign an image code to each extracted character image.

The character extracting module 1210 transmits the extracted character images to the font registering module 1220, the font-code determining module 1230 and the character-code determining module 1240, and transmits the character sizes and the positions of the character images to the output-file generating module 1260. Also, the character extracting module 1210 may transmit the image codes to the respective modules to perform some processes using the image codes.

Figure 13:
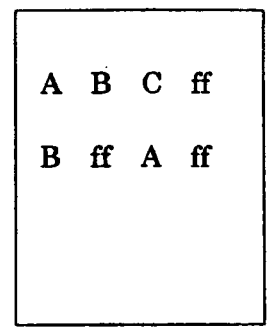
FIG. 13 is an explanatory view showing an example of a target image.
Figure 14:
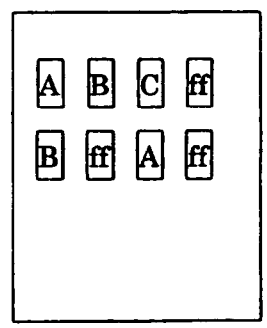
FIG. 14 is an explanatory view showing an example of a result of character extracting processing for the target image.

For example, it is assumed that an image shown in FIG. 13 is input to the character extracting module 1210. The character extracting module 1210 extracts characters from the input image, as shown in FIG. 14. That is, images surrounded by 8 rectangles are results of extracting character images. For example, "ff" is extracted as one character image.

Also, the character extracting module 1210 assigns numbers (image codes) to the respective extracted character images. The image codes may be any codes so long as they can identify the respective extracted character images.

Figure 15:
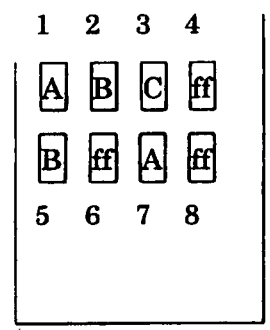
FIG. 15 is an explanatory view showing an example where an image code is assigned to a extracted character image.

FIG. 15 shows an example of image codes assigned in order from 1 in turn.

The font registering module 1220 is connected to the character extracting module 1210, the font-code determining module 1230 and the output-file generating module 1260.

The font registering module 1220 generates a font file that associates the character images extracted by the character extracting module 1210 with the font codes assigned by the font-code determining module 1230. That is, the font registering module 1220 registers the character images, that is, fonts, as shown in FIG. 16. The font file is configured to have font information as shown in FIG. 16 and a table having a font code column 1601 and a font column 1602. The table of FIG. 16 shows the example shown in FIG. 15.

Also, in this exemplary embodiment, each font code is defined by the same number as the corresponding image code. When an image is formed (that is, restored), a font code may be determined from an image code to acquire a font image. Alternatively, a code that can be used for an actual font may be assigned as the font code. For example, extended character codes may be assigned so as not to overlap with each other.

The generated font file is transmitted to the output-file generating module 1260.

The font-code determining module 1230 is connected to the character extracting module 1210, the font registering module 1220, the correspondence-table generating module 1250 and the output-file generating module 1260.

The font-code determining module 1230 assigns the font code to each character image extracted by the character extracting module 1210. Also, the font-code determining module 1230 may associates each font code with the image code of the character image corresponding to each font code. The font-code determining module 1230 transmits its processing results to the font registering module 1220, the output-file generating module 1260 and the correspondence-table generating module 1250.

The character-code determining module 1240 is connected to the character extracting module 1210 and the correspondence-table generating module 1250.

The character-code determining module 1240 performs character recognition for the character images extracted by the character extracting module 1210. That is, the character-code determining module 1240 assigns a character code as a result of the character recognition to each extracted character image. The character-code determining module 1240 transmits the character codes, which are the results of the character recognition, to the correspondence-table generating module 1250.

The correspondence-table generating module 1250 is connected to the font-code determining module 1230, the character-code determining module 1240 and the output-file generating module 1260.

The correspondence-table generating module 1250 associates the font codes assigned by the font-code determining module 1230 with the character codes, which are the results of the character recognition performed by the character-code determining module 1240. The correspondence-table generating module 1250 transmits a result of the associating process to the output-file generating module 1260.

If one character code corresponds to one extracted character image (or one font), the character-code determining module 1240 may re-assign such a character code as an image code or a font code.

However, if two or more character codes correspond to one extracted character image (that is, corresponding to one image code or one font code), it is difficult to perform the above associating process.

Therefore, the correspondence-table generating module 1250 generates a correspondence table 1700 between font codes and character codes.

As shown in FIG. 17, the correspondence table 1700 between font codes and character codes takes a font code as its input and outputs one or more character codes in response. More specifically, the correspondence table 1700 between font codes and character codes is a table including a font code column 1710 and a character code column 1702. In FIG. 17, symbol <X> represents a code of a character "X."

The output-file generating module 1260 is connected to the character extracting module 1210, the font registering module 1220, the font-code determining module 1230 and the correspondence-table generating module 1250.

The output-file generating module 1260 generates an output file based on the font file generated by the font registering module 1220, the font codes assigned by the font-code determining module 1230, and the positions of the character images, which are extracted by the character extracting module 1210 and correspond to the font codes.

Also, the output-file generating module 1260 may generate the output file based on the font file generated by the font registering module 1220, the font codes assigned by the font-code determining module 1230, and the positions and sizes of the character images, which are extracted by the character extracting module 1210 and correspond to the font codes.

Also, the output-file generating module 1260 may generate the output file based on the correspondence relation between the character codes and the font codes, which are associated with each other by the correspondence-table generating module 1250.

Also, the output-file generating module 1260 may form the output file based on the font file generated by the font registering module 1220, the font codes assigned by the font-code determining module 1230, positions of pixel blocks, which are extracted by the character extracting module 1210 and correspond to the font codes, and the correspondence relation between the character codes and the font codes, which are associated with each other by the correspondence-table generating module 1250.

Figures 18, 19:
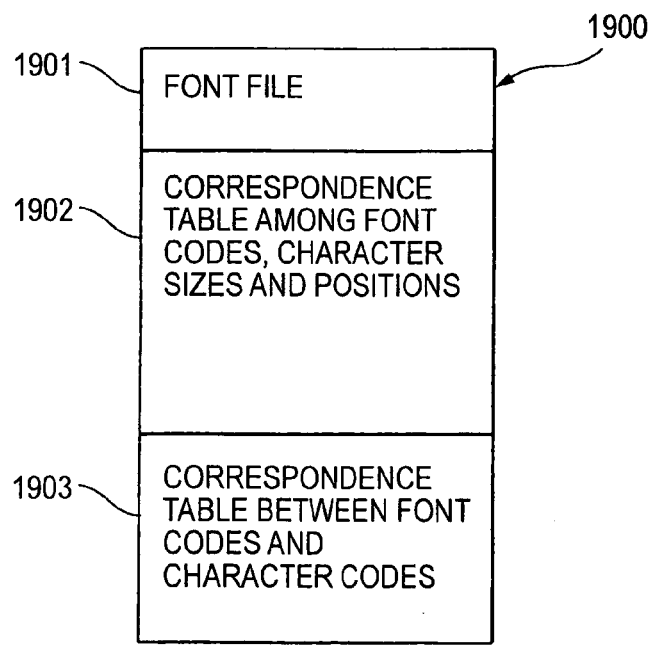
FIG. 18 is an explanatory view showing an example of a data structure of a correspondence table among the font codes, character sizes and positions.
FIG. 19 is an explanatory view showing an example of a data structure of an output file.

For example, the output-file generating module 1260 generates the output file by bringing the font information shown in FIG. 16, the correspondence table 1700 between font codes and character codes shown in FIG. 17, and a correspondence table 1800 among font codes, character sizes and positions shown in FIG. 18. The correspondence table 1800 among font codes, character sizes and positions is a table including a font code column 1801, a character size column 1802, a character position X column 1803 and a character position Y column 1804. The character size may include the numbers of vertical and horizontal pixels of each character image, point of each character image, or the like. Position information may include the character position X and the character position Y. For example, the character position X indicates an X coordinate of an upper left corner of each character image in the input image and the character position Y indicates a Y coordinate the upper left corner of each character image in the input image.

FIG. 19 shows an example of details of the file output from the output-file generating module 1260. An output file 1900 shown in FIG. 19 includes a font file 1901, a correspondence table 1902 among font codes, character sizes and positions, and a correspondence table between font codes and character codes 1903. The font file 1901 is the font file (its contents are the font information 1600) generated by the font registering module 1901. The correspondence table 1902 among font codes, character sizes and positions is the correspondence table 1800 among font codes, character sizes and positions. The correspondence table 1903 between font codes and character codes is the correspondence table between 17000 font codes and character codes generated by the correspondence-table generating module 1250.

Figure 20:
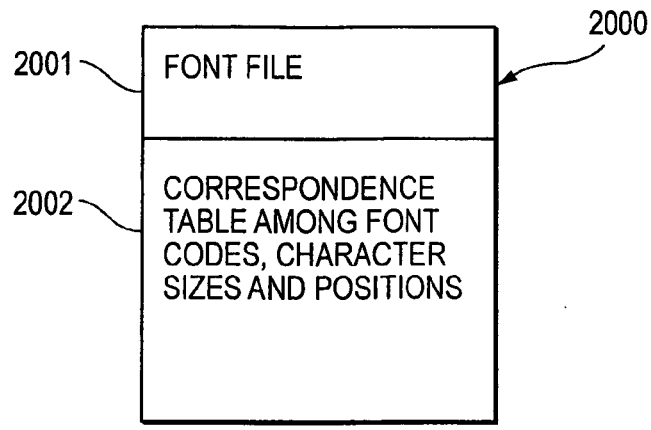
FIG. 20 is an explanatory view showing an example of the data structure of the output file.

In the above, the correspondence table 1903 between font codes and character codes is not essential. This may be deleted if there is no need to acquire the character codes from the output file. In this case, an example of the output file is shown in FIG. 20. That is, an output file 2000 includes a font file 2001 and a correspondence table 2002 among font codes, character sizes and positions.

In this case, the character-code determining module 1240 and the correspondence-table generating module 1250 which are shown in FIG. 12 may be deleted. That is, the image processing apparatus may include the character extracting module 1210, the font registering module 1220, the font-code determining module 1230 and the output-file generating module 1260.

Figure 21:
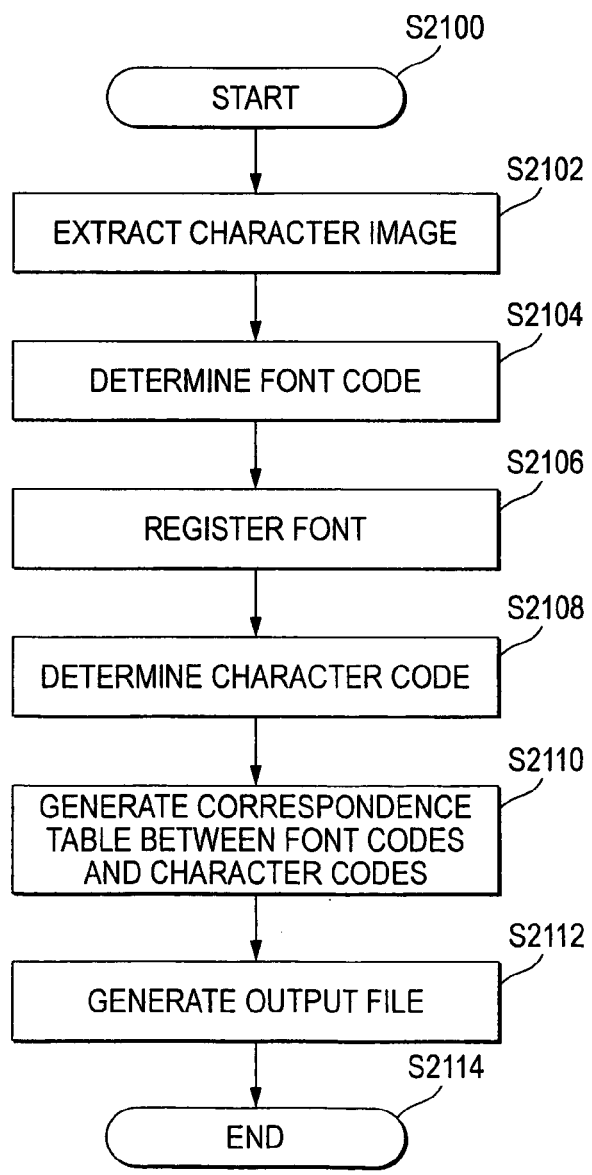
FIG. 21 is a flow chart showing an image processing method according to the fifth exemplary embodiment.

Next, operation and action of the modules of the image processing apparatus according to the fifth exemplary embodiment will be described. An image processing method according to the fifth exemplary embodiment will be described with reference to a flow chart shown in FIG. 21.

In step S2102, the character extracting module 1210 extracts all character images from an input image and extracts character sizes and positions of the character images.

In step S2104, the font-code determining module 1230 assigns a font code to each character image extracted in step S2102.

In step S2106, the font registering module 1220 generates a font file using the character images extracted in step S2102 and the font codes assigned in step S2104.

In step S2108, the character-code determining module 1240 assigns a character code to each character image extracted in step S2102.

In step S2110, the correspondence-table generating module 1250 generates a correspondence table 17000 between font codes and character codes by associating the font codes assigned in step S2104 with the character codes assigned in step S2108.

In step S2112, the output-file generating module 1260 brings the font file generated in step S2106, the font codes assigned in step S2104, the correspondence table 1700 between font codes and character codes generated in step S2110, and the character sizes and the positions extracted in step S2102 together to generate an output file.

Figure 22:
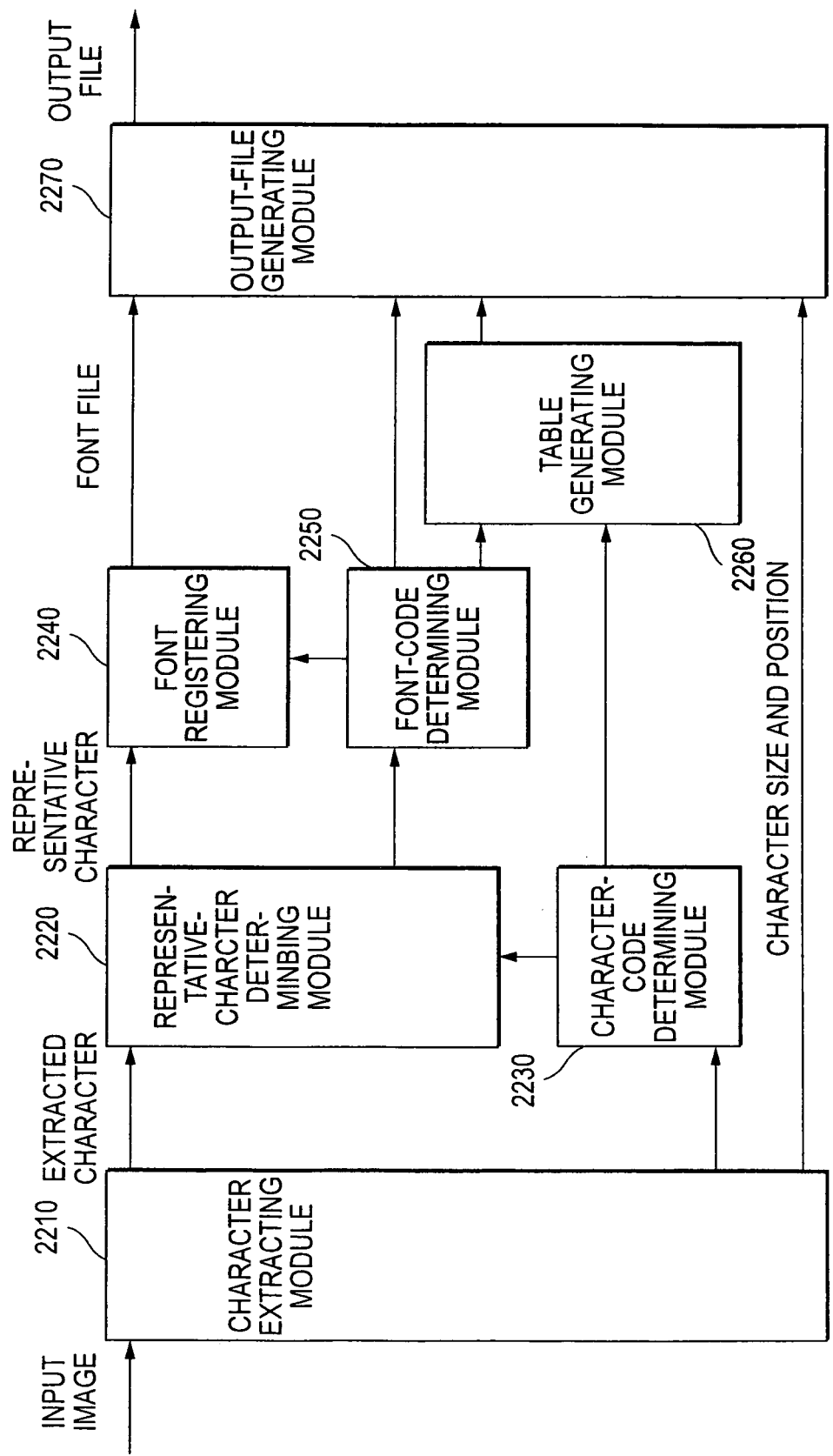
FIG. 22 is a conceptual module configuration diagram of an image processing apparatus according to a sixth exemplary embodiment.

FIG. 22 is a conceptual module configuration diagram of an image processing apparatus according to the sixth exemplary embodiment. In the sixth exemplary embodiment, as shown in FIG. 22, the image processing apparatus includes a character extracting module 2210, a representative-character determining module 2220, a character-code determining module 2230, a font registering module 2240, a font-code determining module 2250, a correspondence-table generating module 2260 and an output-file generating module 2270.

The sixth exemplary embodiment is configured such that groups of similar characters are found from results of extracting character images and representative character images are found from the groups of similar characters found and registered as fonts.

The character extracting module 2210 is connected to the representative-character determining module 2220, the character-code determining module 2230 and the output-file generating module 2270.

The character extracting module 2210 has the same function as the character extracting module 1210 shown in FIG. 12. The character extracting module 2210 transmits the extracted character images to the representative-character determining module 2220 and the character-code determining module 2230, and transmits the character sizes and the positions of the character images to the output-file generating module 2270. Also, the character extracting module 2210 may transmit image codes to the respective modules to perform some processes using the image codes.

The character-code determining module 2230 is connected to the character extracting module 2210, the representative-character determining module 2220 and the correspondence-table generating module 2260.

The character-code determining module 2230 performs character recognition for the character images extracted by the character extracting module 2210. Also, the character-code determining module 2230 may associate image codes of the character images for which the character recognition has been performed with character codes that are results of the character recognition. The character-code determining module 2230 may transmit the correspondence relation between the character codes and the image codes to the representative-character determining module 2220 and the correspondence-table generating module 2260.

The representative-character determining module 2220 is connected to the character extracting module 2210, the character-code determining module 2230, the font registering module 2240 and the font-code determining module 2250.

The representative-character determining module 2220 collects pixel blocks (character images) similar to each other from the character images extracted by the character extracting module 2210 and generates representative character images. Then, the representative-character determining module 2220 associates the representative character images with the character codes, which are the results of the character recognition performed by the character-code determining module 2230. A method for finding similar characters and a method for generating representative characters may be the same as those performed in the representative-character determining module 320 shown in FIG. 3. The representative-character determining module 2220 transmits the process results to the font registering module 2240 and the font-code determining module 2250.

If plural characters are contained in one character image, one font code is assigned to plural image codes.

For example, it is assumed that the image shown in FIG. 13 is input, that the character extracting module 2210 extracts the characters as shown in FIG. 14, and that the image codes are assigned as shown in FIG. 15. In this case, the representative-character determining module 2220 determines that character images corresponding to the image code 1 and the image code 7 have the same shape and generates a representative character. Similarly, the representative-character determining module 2220 determines that character images corresponding to the image code 2 and the image code 5 have the same shape and character images corresponding to the image code 4, the image code 6 and the image code 8 have the same shape, and then generates representative characters. Also, since there is no character image similar to a character image corresponding to the image code 3, a representative character is a character image corresponding to the image code 3. Also, font codes will be assigned to the four representative characters.

The font registering module 2240 is connected to the representative-character determining module 2220, the font-code determining module 2250 and the output-file generating module 2270.

The font registering module 2240 generates a font file that associates the representative character images generated by the representative-character determining module 2220 with the font codes assigned by the font-code determining module 2250. The font registering module 2240 transmits the generated font file to the output-file generating module 2270.

Figure 23:
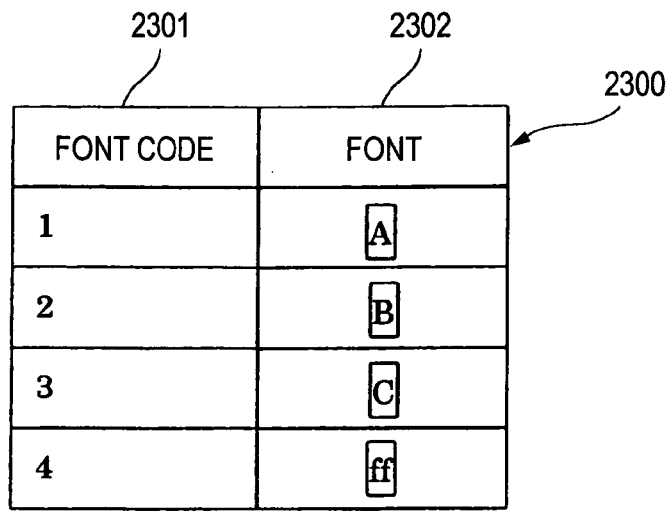
FIG. 23 is an explanatory view showing an example of a data structure of font information.

In the example, which has been described in relation to the representative-character determining module 2220, the font registering module 2240 performs registration as show in FIG. 23. That is, in font information 2300, 1 to 4 are stored as font codes in a font code column 2301, and respective fonts (the representative character image of the image codes 1 and 7, the representative character image of the image codes 2 and 5, and the representative character image of the image codes 4, 6 and 8) are stored in a font column 2302.

The font-code determining module 2250 is connected to the representative-character determining module 2220, the font registering module 2240, the correspondence-table generating module 2260, and the output-file generating module 2270.

The font-code determining module 2250 assigns the font codes to the representative character images generated by the representative-character determining module 2220, and associates the font codes with the image codes of the character images corresponding to the font codes. The font-code determining module 2250 transmits the processing results to the font registering module 2240, the correspondence-table generating module 2260 and the output-file generating module 2270.

Figure 24:
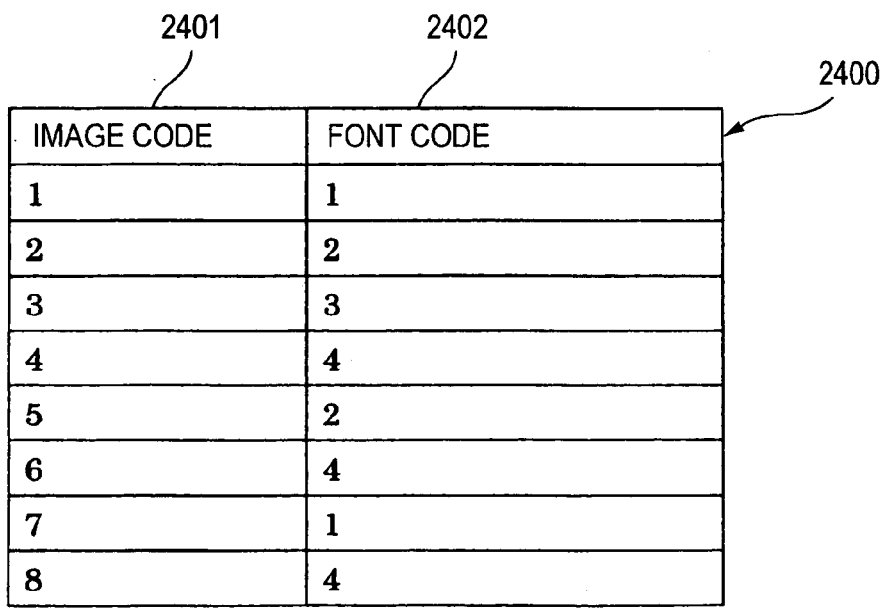
FIG. 24 is an explanatory view showing an example of a data structure of a conversion table between image codes and font codes.

For example, the font-code determining module 2250 may generate a conversion table 2400 between image codes and font codes that is used to convert the image codes into the font code. As shown in FIG. 24, the conversion table between image codes and font codes is a table having an image code column 2401 and a font code column 2402. In the example, which has been described in relation to the representative-character determining module 2220, the font-code determining module 2250 generates the conversion table 2400 between image codes and font codes as shown in FIG. 24. That is, the image codes 1 and 7 correspond to a font code 1, the image codes 2 and 5 correspond to a font code 2, the image code 3 corresponds to a font code 3, and the image codes 4, 6 and 8 correspond to a font code 4.

The correspondence-table generating module 2260 is connected to the character-code determining module 2230, the font-code determining module 2250 and the output-file generating module 2270.

The correspondence-table generating module 2260 associates the font codes assigned by the font-code determining module 2250 with the character codes, which are the results of the character recognition performed by the character-code determining module 2230. The correspondence-table generating module 2260 transmits the processing results to the output-file generating module 2270.

For example, the correspondence-table generating module 2260 generates a correspondence table between font codes and character codes.

If plural character images corresponding to one representative character have the same character code, the character code may be assigned, as it is, to the font code. For example, an example in which the image codes and the character codes are associated as shown in FIG. 25 will be described. A correspondence table 2500 between image codes and character codes has an image code column 2501 and a character code column 2502. A character code <A> is associated with the image codes 1 and 7, a character code <B> is associated with corresponds to the image codes 2 and 5, a character code <C> is associated with the image code 3, and a character code <ff> is associated with the image codes 4, 6 and 8. In this case, a relationship between the font codes and the character codes can be obtained as shown in FIG. 26. That is, a correspondence table 2600 between font codes and character codes has a font code column 2601 and a character code column 2602. The character code <A> corresponds to a font code 1, the character code <B> corresponds to a font code 2, the character code <C> corresponds to a font code 3, and the character code <ff> corresponds to font code 4. Also, <f><f> means two font codes <f>.

However, if different characters are recognized for one representative character, it is problematic. The following processes deal with this problem. For example, it is assumed that a relationship between image codes and character codes is one shown in FIG. 27. That is, the relationship shown in FIG. 27 is different from the correspondence table 2500 between image codes and character codes in that a character code corresponding to the image code 6 is <U>. This occurs in the case where the character-code determining module 2230 erroneously recognizes characters, for example.

In this case, when the representative-character determining module 2220 determines representative characters, the image code 1 and the image code 7 would be determined as similar images, the image code 2 and the image code 5 would be determined as similar images, and the image code 4 and the image code 8 would be determined as similar images. That is, image characters having the same character code is assumed to be similar characters. A conversion table from an image code into a font code is a conversion table 2400 between image codes and font codes shown in FIG. 28. That is, the conversion table 2400 between image codes and font codes shown in FIG. 28 is different from the conversion table 2400 between image codes and font codes shown in FIG. 24 in that a font code corresponding to the image code 6 is 5. That is, different font codes are assigned to character images having different character codes.

Also, a relationship between font codes and character codes is a correspondence table 2600 between font codes and character codes shown in FIG. 29. That is, the correspondence table 2600 between font codes and character codes shown in FIG. 29 is different from the correspondence table 2600 between font codes and character codes shown in FIG. 26 in that font code 5 corresponds to the character code <U>.

The output-file generating module 2270 is connected to the character extracting module 2210, the font registering module 2240, the font-code determining module 2250 and the correspondence-table generating module 2260.

The output-file generating module 2270 generates an output file based on the font file generated by the font registering module 2240, the font codes assigned by the font-code determining module 2250, the positions of the character images, which are extracted by the character extracting module 2210 and correspond to the font codes, and the correspondence relation between the font codes and the character codes, which are associated by the correspondence-table generating module 2260.

Also, the output-file generating module 2270 may generate the output file based on the font file generated by the font registering module 2240, the correspondence relation between the font codes and the image codes, which are associated by the font-code determining module 2250, the positions of the character images corresponding to the image codes, and the correspondence relation between the font codes and the character codes, which are associated by the correspondence-table generating module 2260.

Also, there may inconsistency among (i) the correspondence relation between the image codes and the character codes, (ii) the correspondence relation between the font codes and the character codes and (iii) the image codes and the font codes. In that case, the output-file generating module 2270 may generate the output file in the following manner. That is, the correspondence relation between the font codes and the image codes and the correspondence relation between the font codes and the character codes being reflected are modified using the image codes and the character codes, which are associated with each other by the character-code determining module 2230. As a result, the inconsistency can be resolved. It is noted that, in this example to resolve the inconsistency, the correspondence relation between the image codes and the character codes are not changed while the other two correspondence relations are modified.

Also, the output-file generating module 2270 may generate the output file based on the character sizes of the character images extracted by the character extracting module 2210.

The output file is the same as the output file 1900 shown in FIG. 19 or the output file 2000 shown in FIG. 20. However, a correspondence table 3000 among image codes, font codes, character sizes and positions shown in FIG. 30 may be used instead of the correspondence table 1800 among font codes, character sizes and positions shown in FIG. 18 which is the contents of the correspondence table 1902 among font codes, character sizes and positions (the correspondence table 2002 among font codes, character sizes and positions). That is, the correspondence table 3000 among image codes, font codes, character sizes and positions has an image code column 3001, a font code column 3002, a character size column 3003, a character position X column 3004 and a character position Y column 3005. That is, the correspondence table among image codes, font codes, character sizes and positions 3000 may be a table in which the image code column 3001 is added to the correspondence table 1800 among font codes, character sizes and positions.

The correspondence table 1800 among font codes, character sizes and positions shown in FIG. 18 may be used if the font codes and the image codes have a one-to-one correspondence therebetween. If the font codes and the image codes don't have a one-to-one correspondence therebetween as in the conversion table 2400 between image codes and font codes in FIG. 24, a font code, a character size and a position, which correspond to each image code, are associated as in the correspondence table 3000 among image codes, font codes, character sizes and positions.

Figure 31:
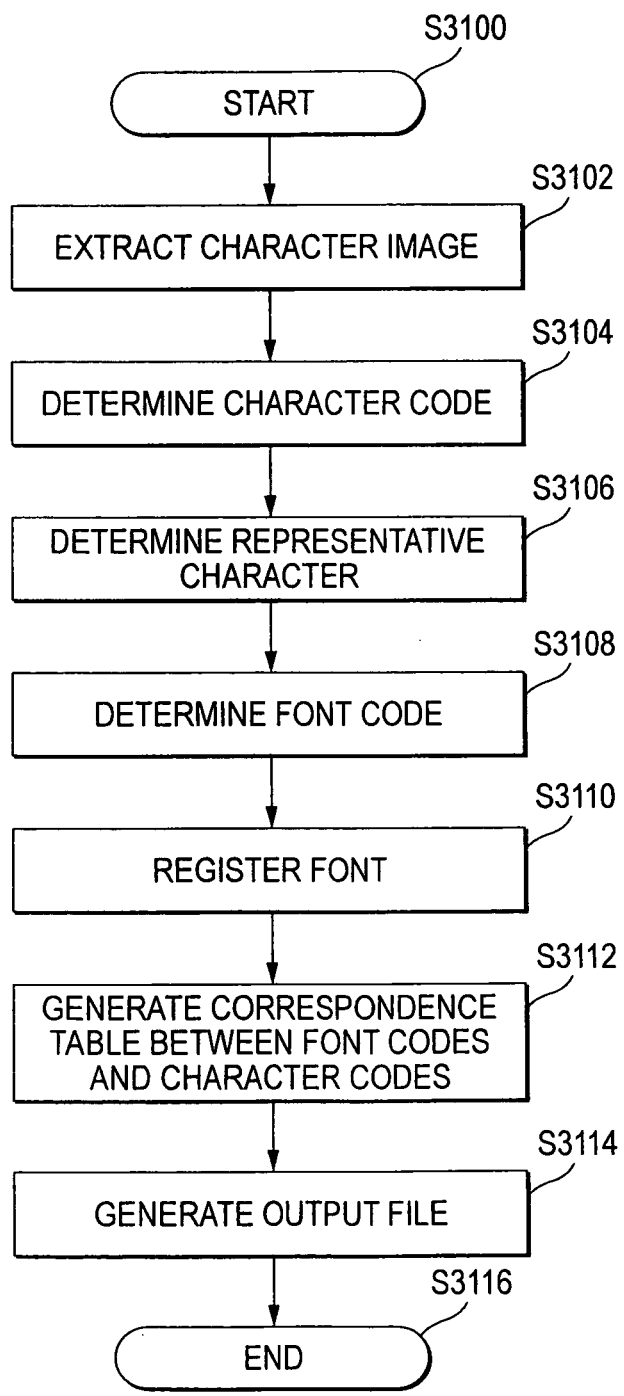
FIG. 31 is a flow chart showing an image processing method according to the sixth exemplary embodiment.

Next, operation and action of the modules of the image processing apparatus according to the sixth exemplary embodiment will be described. An image processing method according to the sixth exemplary embodiment will be described with reference to a flow chart shown in FIG. 31.

In step S3102, the character extracting module 3210 extracts all character images from an input image and extracts character sizes and positions of the character images.

In step S3104, the character-code determining module 2230 assigns character codes to the character images extracted in step S3102.

In step S3106, the representative-character determining module 2220 generates representative character images from the character images extracted in step S3102. Then, the character codes assigned in step S3104 are assigned to the representative character images.

In step S3108, the font-code determining module 2250 assigns font codes to the representative character images generated in step S3106.

In step S3110, the font registering module 2240 generates a font file using the representative character images generated in step S3106 and the font codes assigned in step S3108.

In step S3112, the correspondence-table generating module 2260 generates a correspondence table 2600 between font codes and character codes by associating the font codes assigned in step S3108 and the character codes assigned in step S3104.

In step S3114, the output-file generating module 2270 brings the font file generated in step S3110, the font codes assigned in step S3108, the correspondence table 2600 between font codes and character codes generated in step S3112, and the character sizes and positions extracted in step S3102 together to generate an output file.

Figure 32:
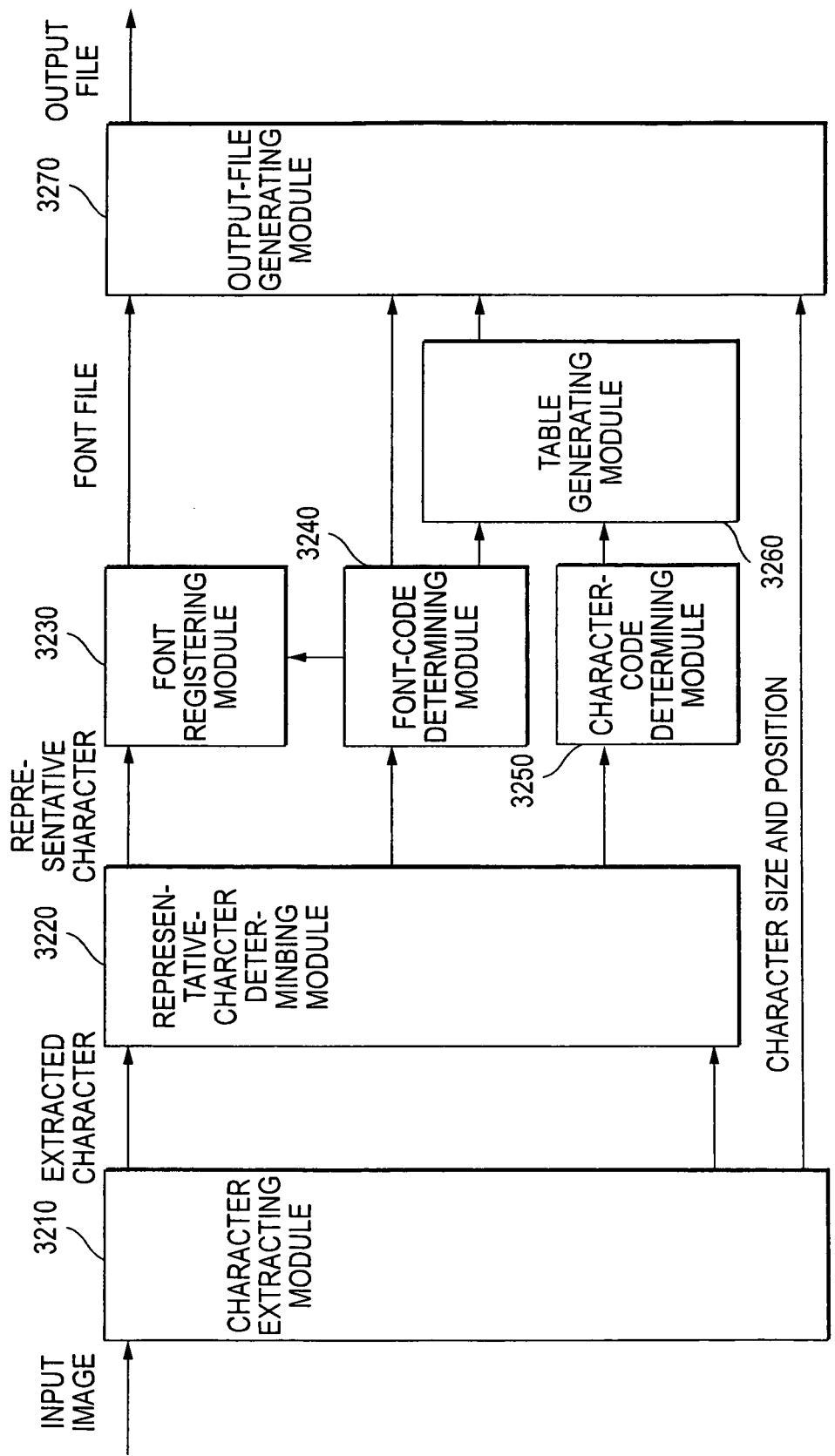
FIG. 32 is a conceptual module configuration diagram of an image processing apparatus according to a seventh exemplary embodiment.

FIG. 32 is a conceptual module configuration diagram of an image processing apparatus according to the seventh exemplary embodiment. In the seventh exemplary embodiment, as shown in FIG. 32, the image processing apparatus includes a character extracting module 3210, a representative-character determining module 3220, a font registering module 3230, a font-code determining module 3240, a character-code determining module 3250, a correspondence-table generating module 3260 and an output-file generating module 3270. The seventh exemplary embodiment is configured such that determination of character codes (for example, character recognition) is made for representative character images, unlike the sixth exemplary embodiment.

The character extracting module 3210 is connected to the representative-character determining module 3220 and the output-file generating module 3270 and has the same function as the character extracting module 2210 shown in FIG. 22. That is, the character extracting module 3210 extracts character images from image data, extracts character sizes and positions of the extracted character images, and assigns image codes to the extracted character images. The character extracting module 3210 transmits the extracted character images to the representative-character determining module 3220, and transmits the extracted character sizes and positions to the output-file generating module 3270.

The representative-character determining module 3220 is connected to the character extracting module 3210, the font registering module 3230, the font-code determining module 3240 and the character-code determining module 3250 and generates representative characters in a similar manner to the representative-character determining module 2220 of FIG. 22. That is, the representative-character determining module 3220 collects similar character images from the character images extracted by the character extracting module 3210 to generate the representative character images. The representative-character determining module 3220 transmits the generated representative character images to the font registering module 3230, the font-code determining module 3240 and the character-code determining module 3250.

In this case, feedback (receiving character codes) from the character-code determining module 3250 is unnecessary because the representative characters and the font codes have a one-to-one correspondence therebetween.

The font registering module 3230 is connected to the representative-character determining module 3220, the font-code determining module 3240 and the output-file generating module 3270 and has the same function as the font registering module 2240 of FIG. 22. That is, the font registering module 3230 generates a font file in which the representative character images generated by the representative-character determining module 3220 are associated with the font codes assigned by the font-code determining module 3240. The font registering module 3230 transmits the generated font file to the output-file generating module 3270.

The font-code determining module 3240 is connected to the representative-character determining module 3220, the font registering module 3230, the correspondence-table generating module 3260 and the output-file generating module 3270 and has the same function as the font-code determining module 2250 of FIG. 22. That is, the font-code determining module 3240 assigns the font codes to the representative character images generated by the representative-character determining module 3220 and associates the font codes with the image codes of the character images corresponding to the font codes. The font-code determining module 3240 transmits the processing results to the font registering module 3230, the correspondence-table generating module 3260 and the output-file generating module 3270.

The character-code determining module 3250 is connected to the representative-character determining module 3220 and the correspondence-table generating module 3260. The character-code determining module 3250 performs character recognition for the representative character images generated by the representative-character determining module 3220 and associates the image codes of the character images with the character codes, which are results of the character recognition. The character-code determining module 3250 transmits the processing results to the correspondence-table generating module 3260.

The correspondence-table generating module 3260 is connected to the font-code determining module 3240, the character-code determining module 3250 and the output-file generating module 3270 and has the same function as the correspondence-table generating module 2260 of FIG. 22. That is, the correspondence-table generating module 3260 associates the font codes assigned by the font-code determining module 3240 with the character codes, which are the results of the character recognition performed by the character-code determining module 3250. The correspondence-table generating module 3260 transmits the processing results to the output-file generating module 3270.

The output-file generating module 3270 is connected to the character extracting module 3210, the font registering module 3230, the font-code determining module 3240 and the correspondence-table generating module 3260 and has the same function as the output-file generating module 2270 of FIG. 22. That is, the output-file generating module 3270 generates an output file based on (i) the font file generated by the font registering module 3240, (ii) the correspondence relation between the font codes and the image codes, which are associated with each other by the font-code determining module 3240, (iii) the positions of the character images corresponding to the image codes, and (iv) the correspondence relation between the font codes and the character codes, which are associated with each other by the correspondence-table generating module 3260.

The file output by the output-file generating module 3270 is similar to that of the sixth exemplary embodiment.

Figure 33:
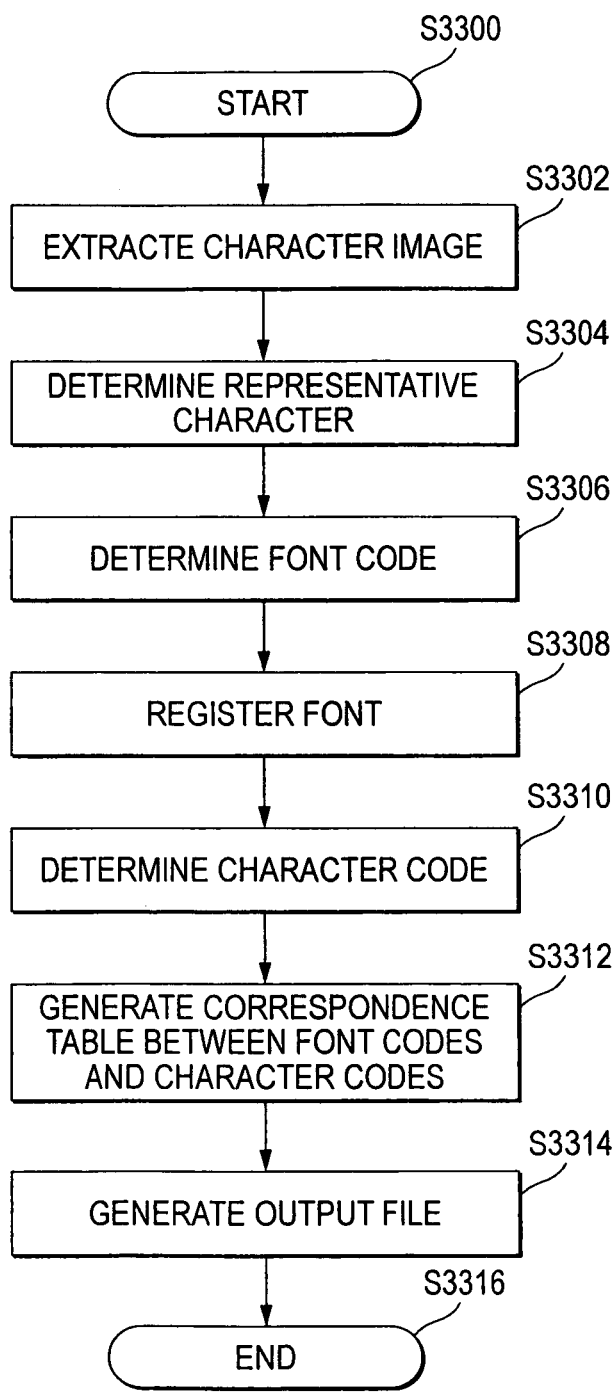
FIG. 33 is a flow chart showing an image processing method according to the seventh exemplary embodiment.

Next, operation and action of the modules of the image processing apparatus according to the seventh exemplary embodiment will be described. An image processing method according to the seventh exemplary embodiment will be described with reference to a flow chart shown in FIG. 33.

In step S3302, the character extracting module 3210 extracts all character images from an input image and extracts character sizes and positions of the character images.

In step S3304, the representative-character determining module 3220 generates representative character images from the character images extracted in step S3302.

In step S3306, the font-code determining module 3240 assigns font codes to the representative character images generated in step S3304.

In step S3308, the font registering module 3230 generates a font file using the representative character images generated in step S3304 and the font codes assigned in step S3306.

In step S3310, the character-code determining module 3250 assigns character codes to the representative character images generated in step S3304.

In step S3312, the correspondence-table generating module 3260 generates a correspondence table 2600 between font codes and character codes by associating the font codes assigned in step S3306 with the character codes assigned in step S3310.

In step S3314, the output-file generating module 3270 brings the font file generated in step S3308, the font codes assigned in step S3306, the correspondence table 2600 between font codes and character codes generated in step S3312, and the character sizes and positions extracted in step S3302 together, to generate an output file.

Now, modifications of the fifth to seventh exemplary embodiments will be described.

The enlarging module 540 shown in FIG. 5 may be added to the representative-character determining module 2220 of the sixth exemplary embodiment or the representative-character determining module 3220 of the seventh exemplary embodiment. That is, the representative-character determining modules 2220 and 3220 may perform an enlarging process for the representative character images and transmit the enlarged representative character images as pixel blocks to the font registering modules 2240 and 3230. This modification is appropriate for the case where character images having high quality are to be reproduced.

Also, although the assignment of the font codes is not particularly limited in the fifth to seventh exemplary embodiments, the character codes may be, as they are, assigned as the font codes. In this case, however, there is a possibility that the character codes overlap with each other. If the character codes overlap with each other, there arises such a problem that plural codes are assigned to different images (representative character images).

Accordingly, if the character codes overlap with each other, the character codes may be registered as different font species, or the character codes may be assigned, as they are, to one image with extended character codes being assigned to other images.

Next, eighth to tenth exemplary embodiments will be described. An image compressing technique, particularly JBIG2 Text Region (hereinafter referred to as "JBIG2 TR"), will be described below.

In JBIG2 TR, a partial image (hereinafter may be referred to as an input partial image) appearing to be a character image is extracted from binary image data, and the extracted input partial image is compared with partial image data which was registered in a dictionary (hereinafter may be referred to as registered partial images). If no partial image similar to the input partial image is found, the input partial image is registered in the dictionary. If a partial image similar to the input partial image is found, the similar partial image is encoded based on an index indicating the similar partial image in the dictionary and a position of the input partial image in the binary image data.

On the other hand, there is a character super resolution technique in which plural pieces of character image data having the same shape are extracted from a document image, phases in which the extracted plural pieces of character image data are scanned are estimated, and character image data having a higher resolution are generated based on the estimated phases.

The eighth to tenth exemplary embodiments are useful for the case where performance of image compression such as JBIG2 TR is to be improved using the character super resolution technique.

Now, JBIG2 TR and so on will be described with reference to FIGS. 37 to 40.

When character image data generated by scanning-in originally same character images are encoded by JBIG2 TR, one of two different cases has to be selected: (i) it is preferable to encode the character image data into different character image data (attaching importance to an image quality) and (ii) it is preferable to encode the character image data into the same character image data (attaching importance to a compression rate), in accordance with a resolution and a phase of scan-in.

Figure 37:
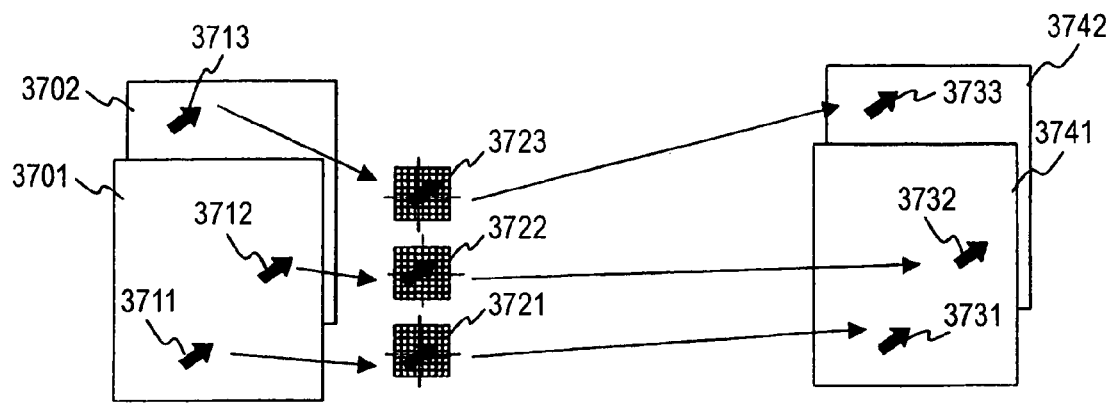
FIG. 37 is an explanatory view showing a JBIG2 TR technique.

The case where it is preferable to encode the character image data into different character image data will be first described with reference to FIG. 37. Generally, it is natural that plural same character images (partial images 3711, 3712 and 3713) are contained in document images 3701 and 3702.

Although the character images are the same, phases of scan-in are misaligned. Therefore, those images are encoded into different character image data (partial images 3721, 3722 and 3723).

In decoding, partial images 3731, 3732 and 3733 in document images 3741 and 3742 have no deterioration in image quality because original character image data are decoded as they are. However, since the same character images are encoded separately, a compression rate is low.

Figure 38:
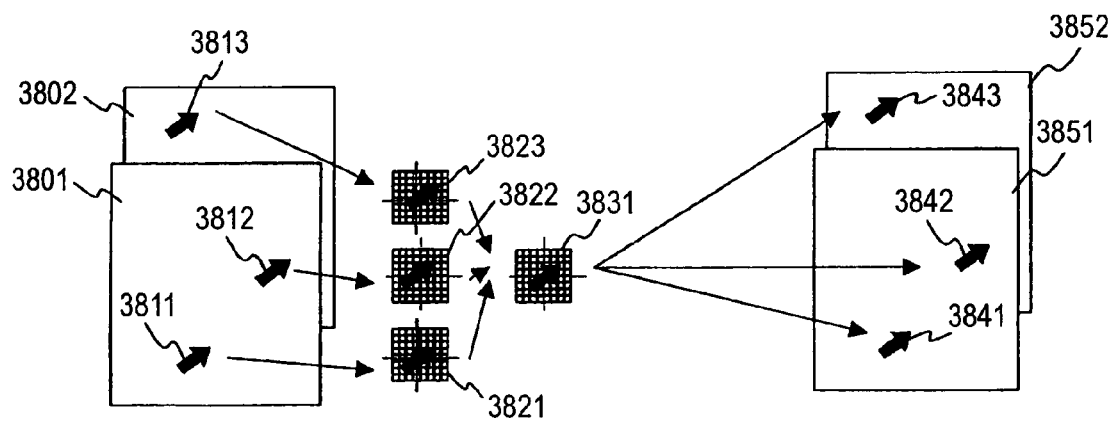
FIG. 38 is an explanatory view showing the JBIG2 TR technique.

Next, the case where it is preferable to encode the character image data into the same character image data will be described with reference to FIG. 38. Like FIG. 37, generally, it is natural that plural same character images (partial images 3811, 3812 and 3813) are contained in document images 3801 and 3802.

Since the character images (partial images 3821, 3822 and 3823) are the same, even if phases of scan-in are misaligned, the same character images are encoded into one representative character image data (partial image 3831). In this case, since an encoding target is only the representative character image data, a compression rate is high.

However, in decoding, partial images 3841, 3842 and 3843 in document images 3851 and 3852 may suffer from any deterioration in image quality due to distortion of a character string because original character image data are replaced with character image data having different phases.

Figure 39:
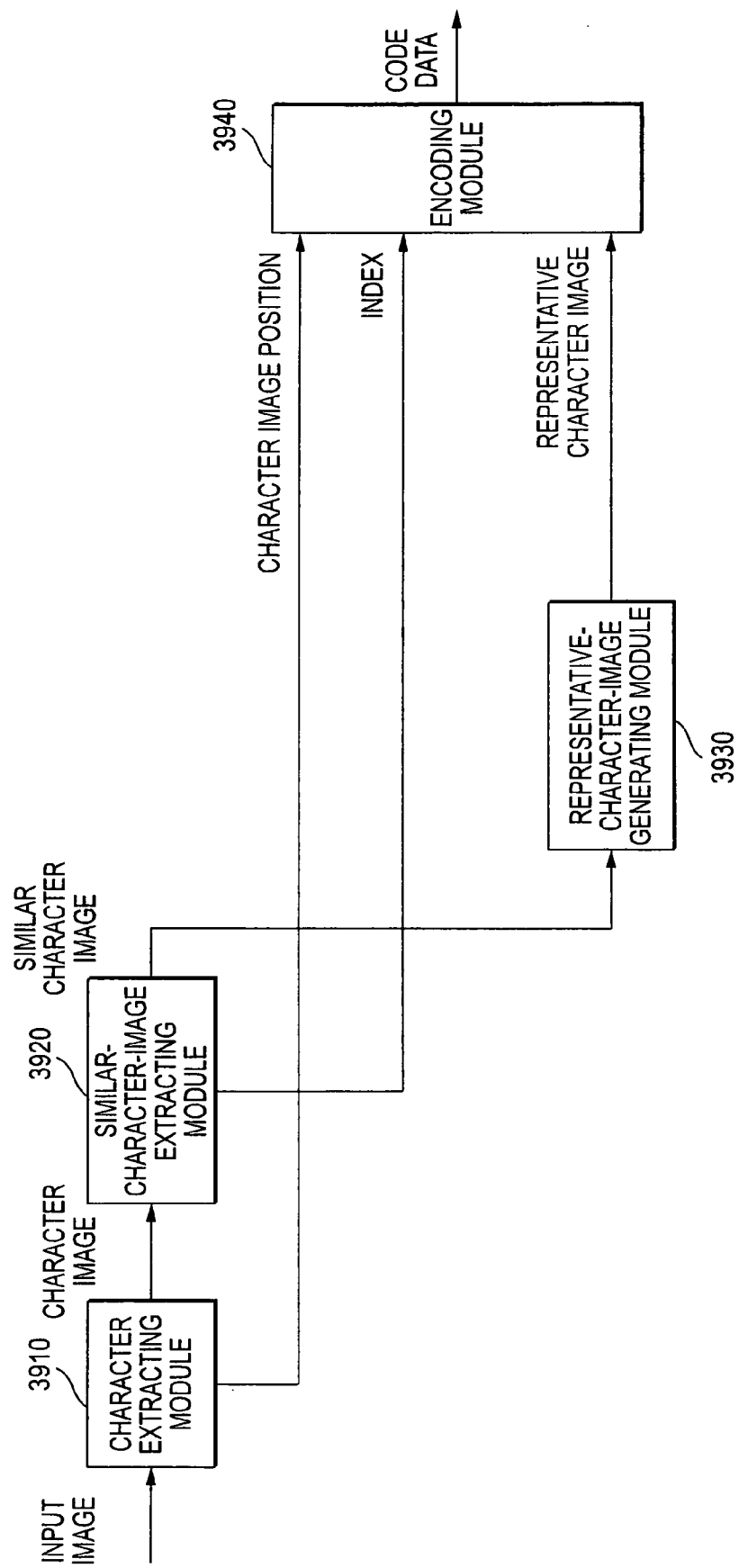
FIG. 39 is an explanatory view showing an encoding technique in JBIG2 TR.

Now, encoding of JBIG2 TR will be described with reference to FIG. 39 which is a typical module configuration diagram of an encoding device that performs JBIG2 TR encoding. This encoding device includes a character extracting module 3910, a similar-character-image extracting module 3920, a representative-character-image generating module 3930 and an encoding module 3940.

The character extracting module 3910 is connected to the similar-character-image extracting module 3920 and the encoding module 3940. The similar-character-image extracting module 3920 is connected to the character extracting module 3910, the representative-character-image generating module 3930 and the encoding module 3940. The representative-character-image generating module 3930 is connected to the similar-character-image extracting module 3920 and the encoding module 3940. The encoding module 3940 is connected to the character extracting module 3910, the similar-character-image extracting module 3920 and the representative-character-image generating module 3930.

The character extracting module 3910 extracts character image data from image data obtained by scanning-in an original. At this time, positions of the extracted character image data are obtained.

The similar-character-image extracting module 3920 compares the extracted character image data with each other to plural pieces of extract character image data having a similar shape. Then, the similar-character-image extracting module 3920 assigns an index indicating representative character image data to the plural pieces of character image data having the similar shape.

The representative-character-image generating module 3930 obtains the representative character image data from the plural pieces of character image data having the similar shape.

The encoding module 3940 encodes positions and indexes of each extracted character image data. Also, the representative character image data are encoded separately.

Figure 40:
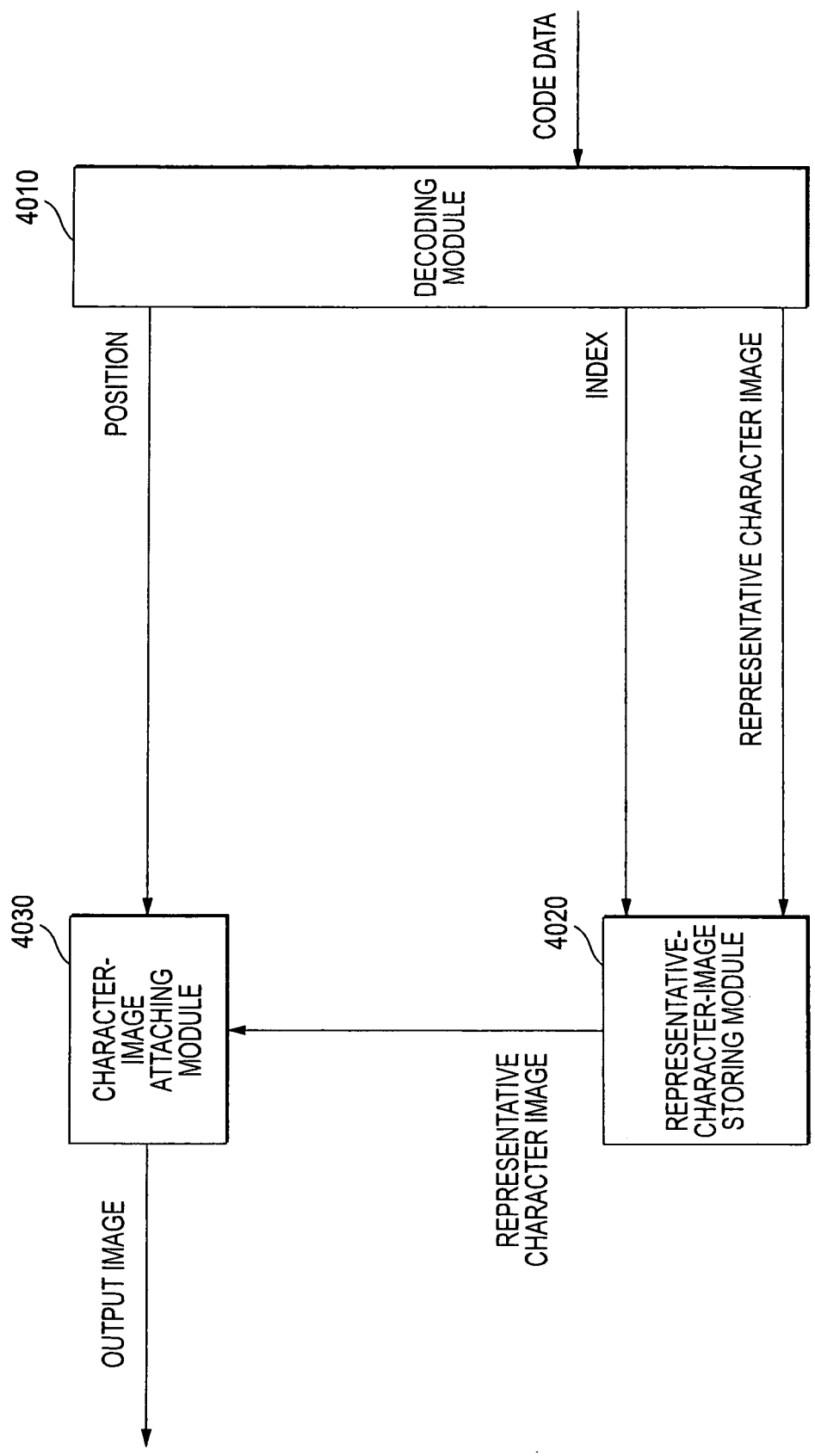
FIG. 40 is an explanatory view showing a decoding technique in JBIG2 TR.

Now, JBIG2 TR decoding will be described with reference to FIG. 40 which is a typical module configuration diagram of a decoding device that performs JBIG2 TR decoding. This decoding device includes a decoding module 4010, a representative-character-image storing module 4020 and a character-image attaching module 4030. The decoding module 4010 is connected to the representative-character-image storing module 4020 and the character-image attaching module 4030. The representative-character-image storing module 4020 is connected to the decoding module 4010 and the character-image attaching module 4030. The character-image attaching module 4030 is connected to the decoding module 4010 and the representative-character-image storing module 4020.

The decoding module 4010 decodes positions and indexes of each character image data. Representative character image data are separately decoded and temporarily stored in the representative-character-image storing module 4020.

The character-image attaching module 4030 acquires the representative character image data corresponding to the index of each character image data. The representative character image data is attached to an image in accordance with the position of each character image data. The same process is performed for all the character image data to generate output image data.

Figure 34:
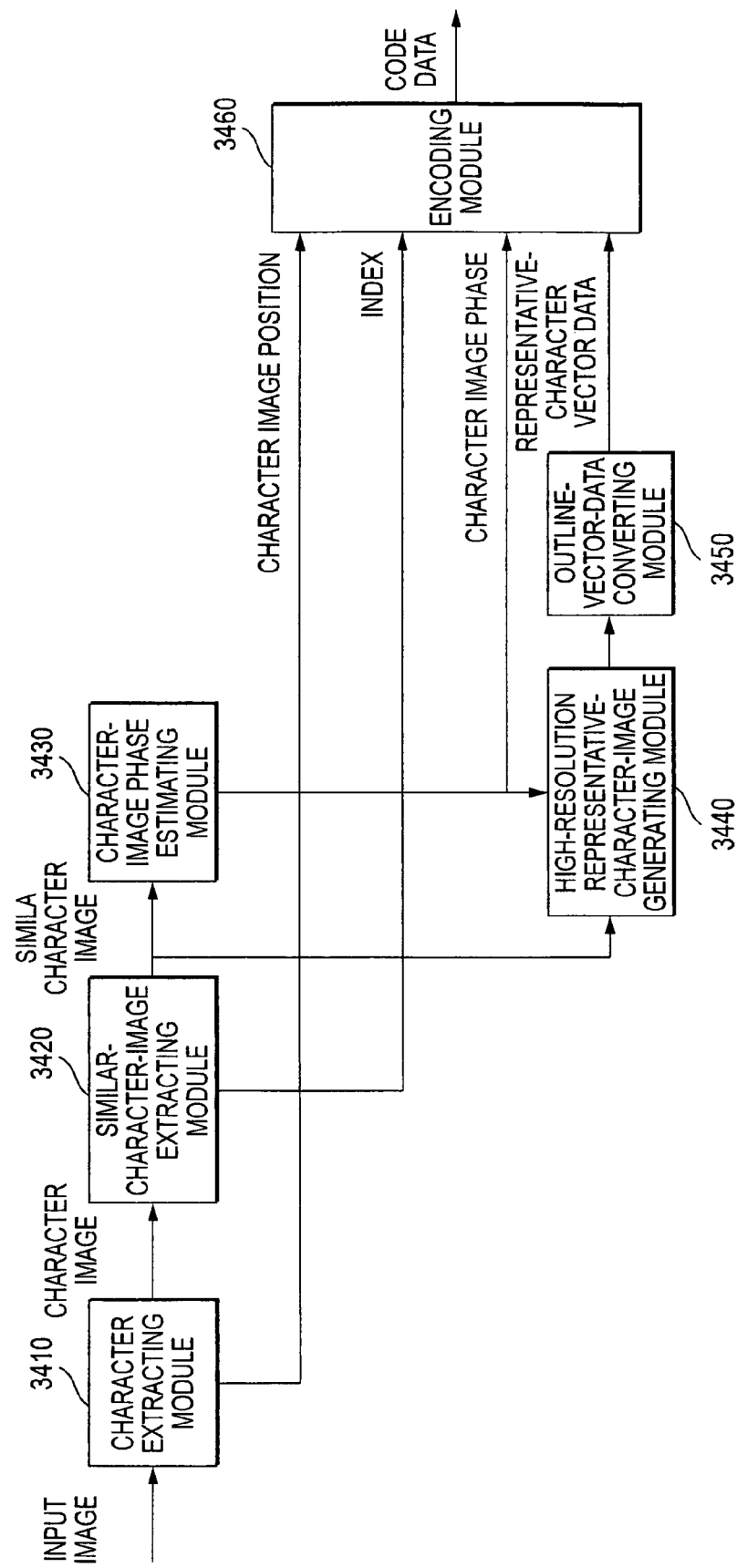
FIG. 34 is a conceptual module configuration diagram of an image processing apparatus according to an eighth exemplary embodiment.

FIG. 34 is a conceptual module configuration diagram of an image processing apparatus according to the eighth exemplary embodiment. In the eighth exemplary embodiment, the image processing apparatus includes a character extracting module 3410, a similar-character-image extracting module 3420, a character-image phase estimating module 3430, a high-resolution representative-character-image generating module 3440, an outline-vector-data converting module 3450 and an encoding module 3460, as shown in FIG. 34.

The character extracting module 3410 is connected to the similar-character-image extracting module 3420 and the encoding module 3460. The character extracting module 3410 extracts character images from image data, and extracts positions of the extracted character images. That is, the character extracting module 3410 extracts character image data from the image data obtained by scanning-in an original. At this time, the character extracting module 3410 also obtains positions of the extracted character image data. The character extracting module 3410 transmits the extracted character images to the similar-character-image extracting module 3420 and transmits the positions of the character images to the encoding module 3460.

The similar-character-image extracting module 3420 is connected to the character extracting module 3410, the character-image phase estimating module 3430, the high-resolution representative-character-image generating module 3440 and the encoding module 3460. The similar-character-image extracting module 3420 compares the character images extracted by the character extracting module 3410 with each other to extracts groups of similar character images. Each group includes character images similar to each other. Then, the similar-character-image extracting module 3420 associates an index that uniquely identifies each group of the similar character images with the similar character images of each group. The similar-character-image extracting module 3420 transmits the groups of the similar character images to the character-image phase estimating module 3430 and the high-resolution representative-character-image generating module 3440, and transmits the indexes to the encoding module 3460.

The character-image phase estimating module 3430 is connected to the similar-character-image extracting module 3420, the high-resolution representative-character-image generating module 3440 and the encoding module 3460. The character-image phase estimating module 3430 estimates phases of the character images based on the groups of the similar character images extracted by the similar-character-image extracting module 3420. That is, the character-image phase estimating module 3430 estimates phases of the similar character image data when the similar character image data are scanned-in (sampled) with precision less than one pixel. The character-image phase estimating module 3430 transmits the estimated phases the high-resolution representative-character-image generating module 3440 and the encoding module 3460.

The high-resolution representative-character-image generating module 3440 is connected to the similar-character-image extracting module 3420, the character-image phase estimating module 3430 and the outline-vector-data converting module 3450. The high-resolution representative-character-image generating module 3440 generates a representative character image having a resolution higher than the input image based on each group of the similar character images extracted by the similar-character-image extracting module 3420 and the phases estimated by the character-image phase estimating module 3430. That is, the high-resolution representative-character-image generating module 3440 obtains representative character image data having a resolution higher than a scan-in resolution, based on the estimated phases and the similar character image data. A process of generating the character image having the higher resolution may be similar to that used in the enlarging module 540 of the third exemplary embodiment. The high-resolution representative-character-image generating module 3440 transmits the representative character images having the higher resolution to the outline-vector-data converting module 3450.

The outline-vector-data converting module 3450 is connected to the high-resolution representative-character-image generating module 3440 and the encoding module 3460. The outline-vector-data converting module 3450 converts the representative character images generated by the high-resolution representative-character-image generating module 3440 into vector information. That is, the outline-vector-data converting module 3450 converts the representative character image data into outline vector data. The outline-vector-data converting module 3450 assigns indexes indicating the representative character image data, to the representative character image data. The outline-vector-data converting module 3450 transmits the processing results to the encoding module 3460. Specifically, each index assigned by the outline-vector-data converting module 3450 includes information uniquely indicating the corresponding representative character image data. Each index is included in output data in the form of a code, such as a font code or a character code, indicating a shape of the corresponding representative character image. The indexes are implemented by the file format described in the previous exemplary embodiment.

The encoding module 3460 is connected to the character extracting module 3410, the similar-character-image extracting module 3420, the character-image phase estimating module 3430 and the outline-vector-data converting module 3450. The encoding module 3460 performs encoding based on (i) the position of each character image extracted by the character extracting module 3410, the index associated with each character image by the similar-character-image extracting module 3420, the phase estimated by the character-image phase estimating module 3430, and the vector information obtained by the outline-vector-data converting module 3450. That is, the position, the phase and the index of each extracted character image data are encoded. Representative-character vector data converted into the outline vector data are encoded separately.

This exemplary embodiment may be employed in the case where an image is to be compressed at a high compression rate and with less deterioration in image quality. That is, character image data which were the originally same character image data may be encoded into one representative character image data in order to increase a compression rate, and scan-in phases for the character image data may be precisely reproduced in order to prevent image quality from being deteriorated.

Figure 35:
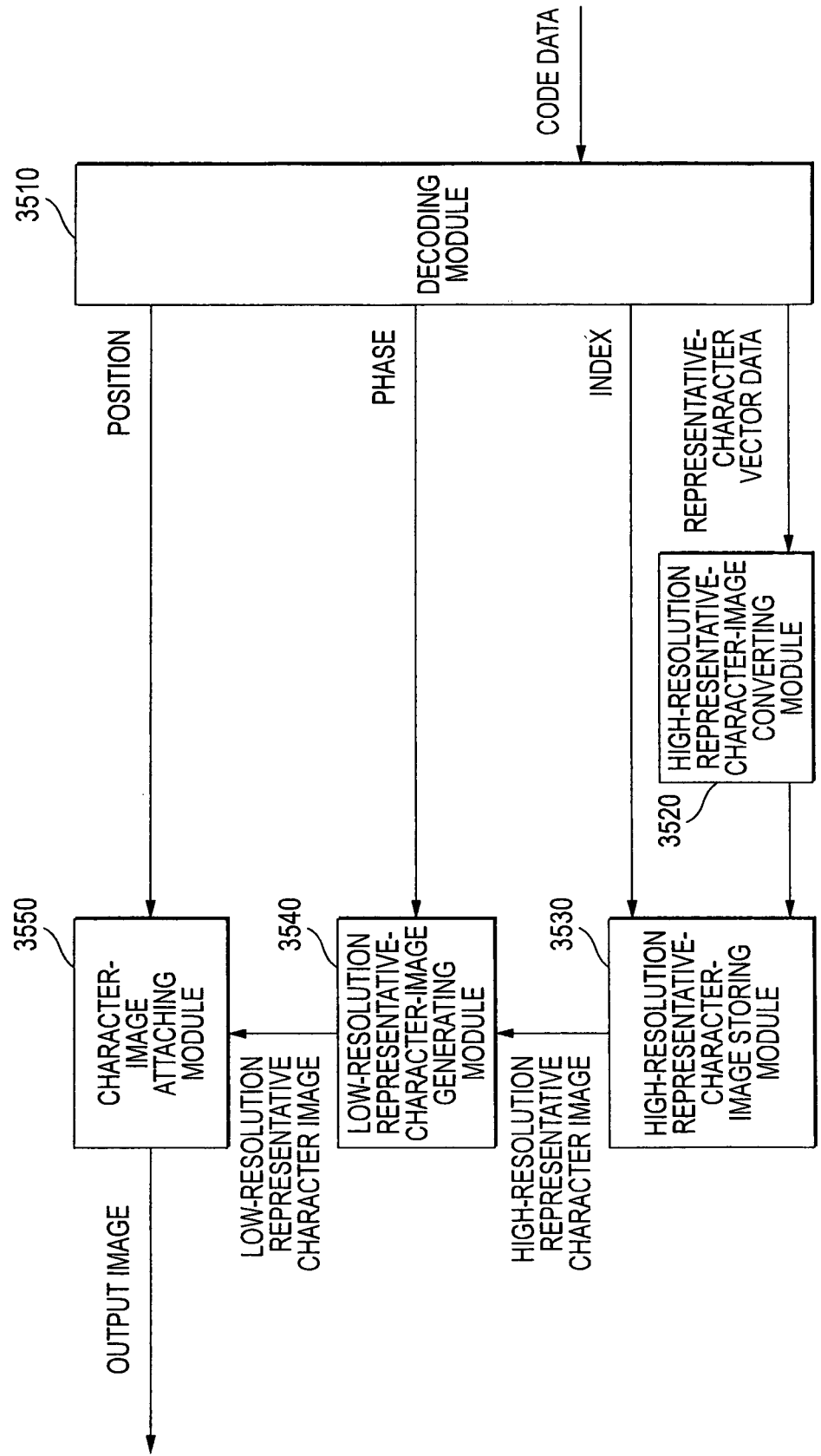
FIG. 35 is a conceptual module configuration diagram of an image processing apparatus according to a ninth exemplary embodiment.

FIG. 35 is a conceptual module configuration diagram of an image processing apparatus according to the ninth exemplary embodiment. In the ninth exemplary embodiment, the image processing apparatus includes a decoding module 3510, a high-resolution representative-character-image converting module 3520, a high-resolution representative-character-image storing module 3530, a low-resolution representative-character-image generating module 3540 and a character-image attaching module 3550, as shown in FIG. 35.

The decoding module 3510 is connected to the high-resolution representative-character-image converting module 3520, the high-resolution representative-character-image storing module 3530, the low-resolution representative-character-image generating module 3540 and the character-image attaching module 3550. The decoding module 3510 decodes a position of each character image, a phase of each character image, an index of a representative character image corresponding to each character image, and vector information of the representative character image from encoded data. The decoding module 3510 transmits the decoded position, phase and index of each character image and the vector information of the representative character image corresponding to each character image to the character-image attaching module 3550, the low-resolution representative-character-image generating module 3540, the high-resolution representative-character-image storing module 3530, and the high-resolution representative-character-image converting module 3520.

The high-resolution representative-character-image converting module 3520 is connected to the decoding module 3510 and the high-resolution representative-character-image storing module 3530. The high-resolution representative-character-image converting module 3520 generates representative character images having a higher resolution from the vector information encoded by the decoding module 3510. The generated representative character images are stored in the high-resolution representative-character-image storing module 3530.

The high-resolution representative-character-image storing module 3530 is connected to the decoding module 3510, the high-resolution representative-character-image converting module 3520 and the low-resolution representative-character-image generating module 3540. The high-resolution representative-character-image storing module 3530 stores the high-resolution representative character images generated by the high-resolution representative-character-image converting module 3520 and the indexes decoded by the decoding module 3510 in association with each other. The high-resolution representative-character-image storing module 3530 acquires representative character image data corresponding to the index for each character image data. Then, the high-resolution representative-character-image storing module 3530 transmits the acquired representative character image data to the low-resolution representative-character-image generating module 3540.

The low-resolution representative-character-image generating module 3540 is connected to the decoding module 3510, the high-resolution representative-character-image storing module 3530 and the character-image attaching module 3550. The low-resolution representative-character-image generating module 3540 generates each character image having a resolution lower than the high-resolution representative character image based on (i) the representative character image, which corresponds to each character image and which is stored in the high-resolution representative-character-image storing module 3530, and (ii) the phase of each character image decoded by the decoding module 3510. That is, the low-resolution representative-character-image generating module 3540 reduces the high-resolution representative character images acquired from the high-resolution representative-character-image storing module 3530 in accordance with the phase of each character image data to generate the low-resolution representative character image data. The low-resolution representative-character-image generating module 3540 transmits the low-resolution representative character image data to the character-image attaching module 3550.

The character-image attaching module 3550 is connected to the decoding module 3510 and the low-resolution representative-character-image generating module 3540. The character-image attaching module 3550 generates an image based on the character images generated by the low-resolution representative-character-image generating module 3540 and the positions of the character images decoded by the decoding module 3510. That is, each low-resolution representative character image data are attached in accordance with its position.

Also, the same process is performed for all the character image data to generate output image data.

This exemplary embodiment may be employed in the case where image data having a high compression rate, which is encoded by the eighth exemplary embodiment, are to be decoded with high image quality. This is because representative character image data having a resolution higher than the original resolution can be used to enlarge a decoded image.

Figure 36:
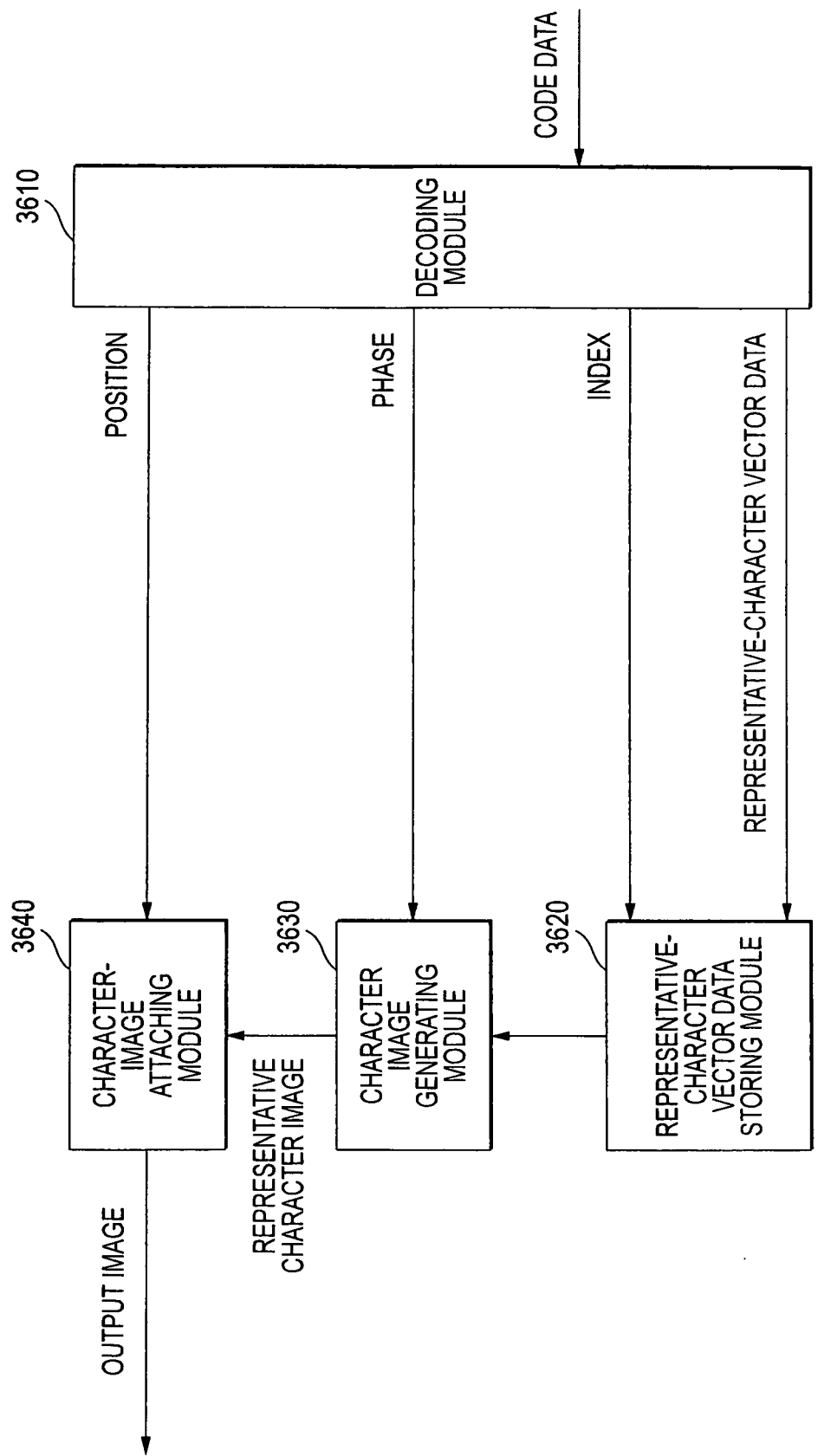
FIG. 36 is a conceptual module configuration diagram of an image processing apparatus according to a tenth exemplary embodiment.

FIG. 36 is a conceptual module configuration diagram of an image processing apparatus according to the tenth exemplary embodiment. In the tenth exemplary embodiment, the image processing apparatus includes a decoding module 3610, a representative-character vector data storing module 3620, a character image generating module 3630 and a character-image attaching module 3640.

The decoding module 3610 is connected to the representative-character vector data storing module 3620, the character image generating module 3630 and the character-image attaching module 3640. The decoding module 3610 decodes a position of each character image, a phase of each character image, an index of a representative character image corresponding to each character image, and vector information of the representative character image corresponding to each character image, from encoded data. The decoding module 3610 transmits the position of each character images to the character-image attaching module 3640, transmits the phase of each character image to the character image generating module 3630, and transmits the index of each representative character image and the vector information of each representative character image to the representative-character vector data storing module 3620.

The representative-character vector data storing module 3620 is connected to the decoding module 3610 and the character image generating module 3630. The representative-character vector data storing module 3620 stores the vector information and the indexes decoded by the decoding module 3610 in association with each other, acquires representative-character vector data corresponding to the index for each character image data, and transmits the acquired representative-character vector data to the character image generating module 3630.

The character image generating module 3630 is connected to the decoding module 3610 and the representative-character vector data storing module 3620. The character image generating module 3630 generates a representative character image based on the vector information stored in the representative-character vector data storing module 3620 and the phase of each character image decoded by the decoding module 3610. The character image generating module 3630 transmits the generated representative character images to the character-image attaching module 3640.

The character-image attaching module 3640 is connected to the decoding module 3610 and the character image generating module 3630. The character-image attaching module 3640 generates images based on the representative character images generated by the character image generating module 3630 and the positions of the character images decoded by the decoding module 3610. That is, the representative character image data are attached in accordance with the position of each character image data.

Also, the same process is performed for all the character image data to generate output image data.

This exemplary embodiment may be employed in the case where image data having a high compression rate, which is encoded by the eighth exemplary embodiment, are to be decoded with high image quality. This exemplary embodiment may be employed to enhance image quality in enlarging or reducing a decoded image obtained by decoding encoded data generated by converting representative character image data into outline vector data.

Also, the data structure (font information 1600 and so on) described in the above exemplary embodiments are provided as only an example. The table structure may have any form so long as data stored in other columns of the table can be extracted based on data stored in a particular column of the table. For example, the table structure may be a list data structure or the like.

Also, the exemplary embodiments may be modified to have any of the following configurations.

[1] An image processing apparatus includes an image standardizing unit and a vector converting unit. The image standardizing unit standardizes a portion of image data to generate standardized image data. The vector converting unit converts the standardized image data generated by the image standardizing unit into vector information.

[2] In the image processing apparatus according of [1], the image standardizing unit generates the standardized image data from a plurality of portions of the image data.

[3] An image processing apparatus includes an extracting unit, a code assigning unit and an associating unit. The extracting unit extracts pixel blocks from image data. The code assigning unit assigns to each of the pixel blocks extracted by the extracting unit, an identification code that uniquely identifies each of the extracted pixel blocks. The associating unit associates each pixel block extracted by the extracting unit with the corresponding identification code assigned by the code assigning unit.

[4] A computer-readable medium stores a program causing a computer to execute image processing. The image processing includes: standardizing a portion of image data to generate standardized image data; and converting the standardized image data into vector information.

[5] In the computer-readable medium of [4], the standardizing generates the standardized image data from a plurality of portions of the image data.

[6] A computer-readable medium stores a program causing a computer to execute image processing. The image processing includes: extracting pixel blocks from image data; assigning to each of the extracted pixel blocks, an identification code that uniquely identifies each of the extracted pixel blocks; and associating each extracted pixel block with the corresponding identification code.

[7] An image processing apparatus includes an extracting unit, a first-code assigning unit, an association-information generating unit, and a file generating unit. The extracting unit extracts pixel blocks from image data and extracts positions of the pixel blocks. The first-code assigning unit assigns first codes to the pixel blocks extracted by the extracting unit. The association-information generating unit generates association information that associates the pixel blocks extracted by the extracting unit with the first codes assigned by the first-code assigning unit. The file generating unit generates a file based on (i) the association information generated by the association-information generating unit, (ii) the first codes assigned by the first-code assigning unit, and (iii) the positions of the pixel blocks corresponding to the first codes, the position being extracted by the extracting unit.

[8] In the image processing apparatus of [7], the extracting unit extracts sizes of the extracted pixel blocks. The file generating unit generates the file based on (i) the association information generated by the association-information generating unit, (ii) the first codes assigned by the first-code assigning unit, and (iii) the positions of the pixel blocks corresponding to the first codes and (iv) the sizes of the pixel blocks corresponding to the first codes, the positions and the sizes being extracted by the extracting unit.

[9] The image processing apparatus of any one of [7] and [8], further includes a character recognizing unit and a code associating unit. The character recognizing unit performs character recognition for the pixel blocks extracted by the extracting unit. The code associating unit associates the first codes assigned by the first-code assigning unit with third codes that are results of the character recognition performed by the character recognition unit. The file generating unit generates the file based on the association between the first codes and the third codes by the code associating unit.

[10] An image processing apparatus includes an extracting unit, a first-code assigning unit, an association-information generating unit, a character recognizing unit, a code associating unit and a file generating unit. The extracting unit extracts pixel blocks from image data, extracts positions of the pixel blocks, and assigns second codes to the pixel blocks. The first-code assigning unit assigns first codes to the pixel blocks extracted by the extracting unit and associates the first codes with the second codes of the pixel blocks corresponding to the first codes. The association-information generating unit generates association information that associates the pixel blocks extracted by the extracting unit with the first codes assigned by the first-code assigning unit. The character recognizing unit performs character recognition for the pixel blocks extracted by the extracting unit. The code associating unit associates the first codes assigned by the first-code assigning unit with third codes that are results of the character recognition performed by the character recognition unit. The file generating unit generates a file based on (i) the association information generated by the association-information generating unit, (ii) the first codes assigned by the first-code assigning unit, (iii) the positions of the pixel blocks corresponding to the first codes, the position being extracted by the extracting unit, and (iv) the association between the first codes and the third codes by the code associating unit.

[11] A computer-readable medium stores a program causing a computer to execute image processing. The image processing includes: extracting pixel blocks from image data and extracts positions of the pixel blocks; assigning first codes to the extracted pixel block; generating association information that associates the extracted pixel blocks with the first codes; generating a file based on (i) the generated association information, (ii) the first codes, and (iii) the positions of the extracted pixel blocks corresponding to the first codes.

[12] In the computer-readable medium of [11], the extracting includes extracts sizes of the extracted pixel blocks. The generating the file generates the file based on (i) the generated association information, (ii) the first codes, and (iii) the positions of the extracted pixel blocks corresponding to the first codes and (iv) the sizes of the extracted pixel blocks corresponding to the first codes.

[13] The computer-readable medium of any one of [11] and [12], the image processing further includes: performing character recognition for the extracted pixel blocks; and associating the first codes with third codes that are results of the character recognition. The generating the file generates the file based on the association between the first codes and the third codes.

[13] A computer-readable medium stores a program causing a computer to execute image processing. The image processing includes: extracting pixel blocks from image data, extracting positions of the pixel blocks, and assigning second codes to the pixel blocks; assigning first codes to the extracted pixel blocks and associating the first codes with the second codes of the pixel blocks corresponding to the first codes; associating the extracted pixel blocks with the first codes; performing character recognition for the extracted pixel blocks; associating the first codes with third codes that are results of the character recognition; generating a file based on (i) the generated association information, (ii) the first codes, (iii) the positions of the extracted pixel blocks corresponding to the first codes, and (iv) the association between the first codes and the third codes.

Figure 41:
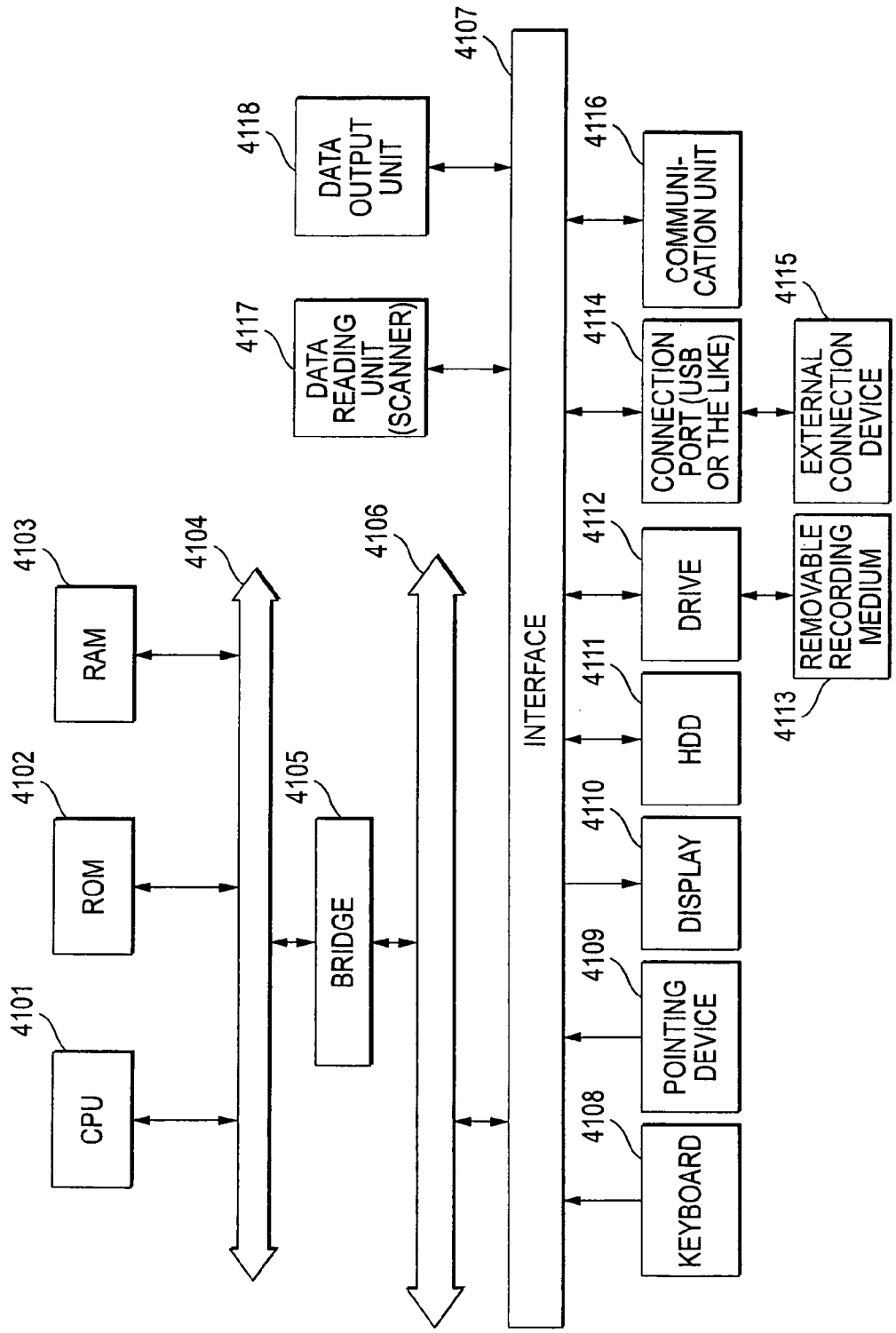
FIG. 41 is a block diagram showing an example of the configuration of a computer to implement any of the above exemplary embodiments.

Now, an example of hardware configuration of the above embodiments will be described with reference to FIG. 41. The hardware shown in FIG. 41 is configured by, for example, a personal computer (PC) or the like, including a data reading unit 4117 such as a scanner, and a data output unit 4118 such as a printer.

CPU (Central Processing Unit) 4101 is a control unit that performs processes according to computer • programs which describe execution sequences of various modules described in the above embodiments, such as the character extracting module 110, the character-code determining module 120, the font registering module 130, the output-file generating module 140, the correspondence-table generating module 1250, the outline-vector-data converting module 3450, the low-resolution representative-character-image generating module 3540 and so on.

ROM (Read Only Memory) 4102 stores programs and operating parameters used by the CPU 4101. RAM (Random Access Memory) 4103 stores programs used for execution of the CPU 4101, parameters that are suitably varied in the execution, etc. These components are interconnected by a host bus 4104 configured by a CPU bus or the like.

The host bus 4104 is connected to an external bus 4106, such as a PCI (Peripheral Component Interconnect/Interface), via a bridge 4105.

A keyboard 4108 and a point device 4109 such as a mouse are input devices that are operated by an operator. A display 4110 such as a liquid crystal display, a cathode ray tube (CRT) or the like displays a variety of information as texts or image information.

HDD (Hard Disk Drive) 4111 contains a hard disk and drives the hard disk to record or reproduce programs executed by the CPU 4101 or other information. The hard disk stores input images, font files, various data processing programs, various computer • programs and so on.

A driver 4112 reads data or programs recorded on a removable recording medium 4113 such as a magnetic disk, an optical disk, a magneto-optical disk or a semiconductor memory, which is mounted thereon, and supplies the read data or programs to the RAM 4103 connected thereto via an interface 4107, the external bus 4106, the bridge 4105 and the host bus 4104. The removable recording medium 4113 can be also used as the same data recording region as the hard disk.

A connection port 4114 is a port that connects an external connection device 4115 and has a connection unit such as USB, IEEE1394 or the like. The connection port 4114 is connected to the CPU 4101 and so on via the interface 4107, the external bus 4106, the bridge 4105, the host bus 4104 and so on. A communication unit 4116 is connected to a network and processes data communication with the outside. The data reading unit 4117 is, for example, a scanner and performs a read process for documents. The data output unit 4118 is, for example, a printer and performs an output process for document data.

Also, the hardware configuration shown in FIG. 41 is provided as an example, and the above embodiments are not limited to the configuration shown in FIG. 41 but may employ any configurations if only they can execute the modules described in the above embodiments. For example, some modules may be configured by dedicated hardware (for example, Application specific Integrated Circuits (ASICs)), some modules may have a form connected by a communication line in an external system, or systems shown in FIG. 41 are interconnected by a plurality of communication lines to cooperate with each other. Also, the modules may be assembled within hardware such as a copy machine, a facsimile, a scanner, a printer, a multi-function apparatus (also referred to as a multifunctional copier including functions of scanner, printer, copy machine, facsimile, etc.) and so on.

Also, if the modules are implemented by computer programs, the modules may be embedded into software to create files that can treat images, such as PDF, EPS (Encapsulated PostScript), XDW (registered trademark) and so on, as vector information.

Also, the above-described programs may be stored in a recording medium or may be provided through a communication means. In this case, for example, the above-described programs may be considered as inventions of "computer readable recording medium having programs recorded thereon"

"Computer readable recording medium having programs recorded thereon" refers to a recording medium that has programs recorded thereon and can be read by a computer, which is used for program installation, execution, distribution and so on.

Also, the recording medium includes, for example, "DVD-R, DVD-RW, DVD-RAM and so on" which are digital • versatile • disk (DVD) and have standards prescribed by DVD Forum, "DVD+R, DVD+RW and so on" which have standards prescribed by DVD+RW, compact disks (CD) such as read only compact disk (CD-ROM), CD-Recordable (CD-R), CD-ReWritable (CD-RW) and so on, magneto-optical disks (MO), flexible disks (FD), magnetic tapes, hard disks, read only memories (ROM), electrically erasable and programmable read only memories (EEPROM), flash memories, random access memories (RAM), etc.

Also, the above-described programs or some thereof may be recorded on the recording medium for conservation or distribution. Also, the above-described programs or some thereof may be transmitted by means of communication, for example, using transmission media such as wired networks used in local area network (LAN), metropolitan area network (MAN), wide area network (WAN), Internet, intranet, extranet and so on, or wireless communication networks, or combinations thereof, or may be carried on a carrier.

Also, the above programs may be a portion of a different program or may be recorded on the recording medium along with different programs. Also, the above programs may be dividedly recorded on a plurality of recording media. Also, the above programs may be recorded in any forms such as compression and coding as long as they can be restored.

What is claimed is:

1. An image processing apparatus comprising:
    an extracting unit that extracts pixel blocks from image data;
    a representative-image generating unit i) that aligns each center of gravity of each extracted pixel block, (ii) that calculates a binary value for each extracted pixel block whose center of gravity is aligned to set a similarity between the extracted pixel blocks, and (iii) that generates representative images from the extracted pixel blocks based on the similarity; and
    a vector converting unit that converts the representative images generated by the representative-image generating unit into vector information.

2. The image processing apparatus according to claim 1, further comprising:
    a character recognizing unit that performs character recognition for the representative images generated by the representative-image generating unit; and an associating unit that associates each result of the character recognition by the character recognizing unit with the corresponding vector information generated by the vector converting unit.

3. The image processing apparatus according to claim 1, further comprising:
a file generating unit that generates a file based on the vector information generated by the vector converting unit.

4. The image processing apparatus according to claim 1, further comprising:
an enlarging process unit that performs an enlarging process for each representative image generated by the representative-image generating unit, wherein
the vector converting unit converts, into vector information, each representative image for which the enlarging process unit has performed the enlarging process.

5. The image processing apparatus according to claim 4, wherein the enlarging process unit performs the enlarging process for each representative image using the plural pixel blocks, which are used by the representative-image generating unit to generate each representative image, so as to generate an enlarged representative image having a resolution higher than the used pixel blocks.

6. The image processing apparatus according to claim 5, wherein the enlarging process unit moves phases of the plural pixel blocks so that centers of gravity of the plural pixel blocks coincide with each other and interpolates pixels values of each enlarged representative image, so as to generate each enlarged representative image having the higher resolution.

7. The image processing apparatus according to claim 3, wherein
the extracting unit extracts a position of each extracted pixel block and assigns a second code to each extracted pixel block, and
the representative-image generating unit generates each representative image by bringing similar pixel blocks of the extracted pixel blocks together based on the similarity between the extracted pixel blocks,
the image processing apparatus further comprising:
a first-code assigning unit that assigns a first code to each representative image generated by the representative-image generating unit and associates each first code with the second codes of the pixel blocks corresponding to each first code;
an association-information generating unit that generates association information that associates each representative image generated by the representative-image generating unit with the corresponding first code assigned by the first-code assigning unit;
a character recognizing unit that performs character recognition for the pixel blocks extracted by the extracting unit; and
a code associating unit that associates each of third codes that are results of the character recognition performed by the character recognition unit with the corresponding first code assigned by the first-code assigning unit, wherein
the file generating unit that generates the file based on (i) the association information generated by the association-information generating unit, (ii) the first codes assigned by the first-code assigning unit, (iii) the positions of the pixel blocks corresponding to the first codes, the position being extracted by the extracting unit, and (iv) the association between the first codes and the third codes by the code associating unit.

8. The image processing apparatus according to claim 3, wherein
the extracting unit extracts a position of each extracted pixel block and assigns a second code to each extracted pixel block, and
the representative-image generating unit generates each representative image by bringing similar pixel blocks of the extracted pixel blocks together based on the similarity between the extracted pixel blocks,
the image processing apparatus further comprising:
a first-code assigning unit that assigns a first code to each representative image generated by the representative-image generating unit and associates each first code with the second codes of the pixel blocks corresponding to each first code;
an association-information generating unit that generates association information that associates each representative image generated by the representative-image generating unit with the corresponding first code assigned by the first-code assigning unit;
a character recognizing unit that performs character recognition for the pixel blocks extracted by the extracting unit; and
a code associating unit that associates each of third codes that are results of the character recognition performed by the character recognition unit with the corresponding first code assigned by the first-code assigning unit, wherein
the file generating unit generates the file based on (i) the association information generated by the association-information generating unit, (ii) the association between the first codes and the second codes by the first-code assigning unit, (iii) the positions of the pixel blocks corresponding to the second codes, and (iv) the association between the first codes and the third codes by the code associating unit.

9. The image processing apparatus according to claim 7, wherein
the character recognizing unit associates each second code of the pixel block for which the character recognition is performed with the corresponding third code, which is the result of the character recognition, and
the file generating unit changes (i) the association between the first codes and the second codes and (ii) the association between the first codes and the third codes based on the second codes and the third codes, which are associated by the character recognition unit, to generates the file.

10. The image processing apparatus according to claim 3, comprising:
the extracting unit extracts a position of each extracted pixel block and assigns a second code to each extracted pixel block, and
the representative-image generating unit generates each representative image by bringing similar pixel blocks of the extracted pixel blocks together based on the similarity between the extracted pixel blocks,
the image processing apparatus further comprising:
a first-code assigning unit that assigns a first code to each representative image generated by the representative-image generating unit and associates each first code with the second codes of the pixel blocks corresponding to each first code;
an association-information generating unit that generates association information that associates each representative image generated by the representative-image generating unit with the corresponding first code assigned by the first-code assigning unit;

a character recognizing unit that performs character recognition for each representative image generated by the representative-image generating unit and associates the second codes corresponding to each representative image with a third code that is a result of the character recognition; and a code associating unit that associates each third code, which is the result of the character recognition performed by the character recognition unit, with the corresponding first code assigned by the first-code assigning unit, wherein the file generating unit generates the file based on (i) the association information generated by the association-information generating unit, (ii) the association between the first codes and the second codes by the first-code assigning unit, (iii) the positions of the pixel blocks corresponding to the second codes, and (iv) the association between the first codes and the third codes by the code associating unit.

11. A non-transitory computer-readable medium storing a program for causing a computer to execute image processing, the image processing comprising:

extracting pixel blocks from image data;

aligning each center of gravity of each extracted pixel block:, calculating a binary value for each extracted pixel block whose center of gravity is aligned to set a similarity between the extracted pixel blocks;

generating representative images from the extracted pixel blocks based on the similarity; and converting the generated representative images into vector information.

12. The non-transitory computer-readable medium according to claim 11, wherein the image processing further comprises:

performing character recognition for the generated representative images; and associating each result of the character recognition with the corresponding vector information.

13. The non-transitory computer-readable medium according to claim 11, wherein the image processing further comprises:

generating a file based on the generated vector information.

14. The non-transitory computer-readable medium according to claim 11, wherein the image processing further comprises:

performing an enlarging process for each generated representative image, wherein the converting converts, into vector information, each representative image for which the enlarging process has been performed.

15. The non-transitory computer-readable medium according to claim 14, wherein the enlarging process is performed for each representative image using the plural pixel blocks, which are used to generate each representative image, so as to generate an enlarged representative image having a resolution higher than the used pixel blocks.

16. The non-transitory computer-readable medium according to claim 15, wherein the performing the enlarging process comprises moving phases of the plural pixel blocks so that centers of gravity of the plural pixel blocks coincide with each other and interpolates pixels values of each enlarged representative image, so as to generate each enlarged representative image having the higher resolution.

17. The non-transitory computer-readable medium according to claim 13, wherein the extracting the pixel blocks comprises extracting a position of each extracted pixel block and assigning a second code to each extracted pixel block, and the generating each representative image generates each representative image by bringing similar pixel blocks of the extracted pixel blocks together based on the similarity between the extracted pixel blocks, the image processing further comprises:

assigning a first code to each generated representative image and associating each first code with the second codes of the pixel blocks corresponding to each first code;

generating association information that associates each generated representative image with the corresponding first code;

performing character recognition for the extracted pixel blocks; and associating each of third codes that are results of the character recognition with the corresponding first code, wherein the generating the file generates the file based on (i) the generated association information, (ii) the first codes, (iii) the extracted positions of the pixel blocks corresponding to the first codes, and (iv) the association between the first codes and the third codes.

18. The non-transitory computer-readable medium according to claim 13, wherein the extracting the pixel blocks comprises extracting a position of each extracted pixel block and assigning a second code to each extracted pixel block, and the generating each representative image generates each representative image by bringing similar pixel blocks of the extracted pixel blocks together based on the similarity between the extracted pixel blocks, the image processing further comprises:

assigning a first code to each generated representative image and associating each first code with the second codes of the pixel blocks corresponding to each first code;

generating association information that associates each generated representative image with the corresponding first code;

performing character recognition for the extracted pixel blocks; and associating each of third codes that are results of the character recognition with the corresponding first code, wherein the generating the file generates the file based on (i) the generated association information, (ii) the association between the first codes and the second codes, (iii) the extracted positions of the pixel blocks, and (iv) the association between the first codes and the third codes.

19. The non-transitory computer-readable medium according to claim 17, wherein the performing the character recognition comprises associating each second code of the pixel block for which the character recognition is performed with the corresponding third code, which is the result of the character recognition, and the generating the file generates the file using the second codes and the third codes, which are associated with each other, with (i) the association between the first codes and the second codes and (ii) the association between the first codes and the third codes being reflected.

20. The non-transitory computer-readable medium according to claim 13, wherein
- the extracting the pixel blocks comprises extracting a position of each extracted pixel block and assigning a second code to each extracted pixel block, and
- the generating each representative image generates each representative image by bringing similar pixel blocks of the extracted pixel blocks together based on the similarity between the extracted pixel blocks,
- the image processing further comprises:
- assigning a first code to each generated representative image and associating each first code with the second codes of the pixel blocks corresponding to each first code;
- generating association information that associates each generated representative image with the corresponding first code;
- performing character recognition for each generated representative image and associating the second codes corresponding to each representative image with a third code that is a result of the character recognition; and
- associating each third code, which is the result of the character recognition, with the corresponding first code, wherein
- the generating the file generates the file based on (i) the generated association information, (ii) the association between the first codes and the second codes, (iii) the extracted positions of the pixel blocks corresponding to the second codes, and (iv) the association between the first codes and the third codes.

21. The image processing apparatus according to claim 1, wherein
- the extracting unit extracts a position of each extracted pixel block;
- the representative-image generating unit comprises
  - a similar-block extracting section extracts groups of pixel blocks from the pixel blocks extracted by the extracting unit, the pixel blocks belonging to each group being similar to each other, the similar-block extracting section that associates a code that uniquely identifies each group of the pixel blocks with each group of the pixel blocks,
  - a phase estimating section that estimates a phase of each pixel block based on the pixel blocks of the extracted groups, and
  - a high-resolution representative-image generating section that generates the representative image having a resolution higher than the pixel blocks of each group based on (i) the pixel blocks of each group extracted by the similar-block extracting section and (ii) the phases estimated by the phase estimating section, and
- the vector converting unit converts the representative images generated by the high-resolution representative-image generating section into vector information,
- the image processing apparatus further comprising:
- an encoding unit that generates output data based on (i) the positions of the pixel blocks extracted by the extracting unit, (ii) the codes associated with the pixel blocks by the similar-block extracting section, (iii) the phases estimated by the phase estimating section, and (iv) the vector information generated by the vector converting unit.

22. An image processing apparatus comprising:
- a decoding unit that decodes positions of pixel blocks, phases of the pixel blocks, a code of each representative image corresponding to the pixel blocks, and vector information of each representative image from data encoded by the image processing apparatus according to claim 21;
- a representative-image generating unit that generates each representative image from the vector information decoded by the decoding unit;
- an image storing unit that stores each representative image generated by the representative-image generating unit and the corresponding code decoded by the decoding unit in association with each other;
- a low-resolution image generating unit that generates pixel blocks having a resolution lower than each representative image based on each representative image stored in the image storing unit and the phases decoded by the decoding unit; and
- an image generating unit that generates an image based on the pixel blocks generated by the low-resolution image generating unit and the positions of the pixel blocks decoded by the decoding unit.

23. An image processing apparatus comprising:
- a decoding unit that decodes positions of pixel blocks, phases of the pixel blocks, a code of each representative image corresponding to the pixel blocks, and vector information of each representative image from data encoded by the image processing apparatus according to claim 21;
- a vector information storing unit that stores each vector information decoded by the decoding unit and the corresponding code decoded by the decoding unit in association with each other;
- a representative-image generating unit that generates a representative image based on each vector information stored in the vector information storing unit and the phases decoded by the decoding unit; and
- an image generating unit that generates an image based on the representative images generated by the representative-image generating unit and the positions of the pixel blocks decoded by the decoding unit.

24. The non-transitory computer-readable medium according to claim 11, wherein
- the extracting the pixel blocks comprises extracting a position of each extracted pixel block,
- the generating the representative images comprises
  - extracting groups of pixel blocks from the extracted pixel blocks, the pixel blocks belonging to each group being similar to each other,
  - associating a code that uniquely identifies each group of the pixel blocks with each group of the pixel blocks,
  - estimating a phase of each pixel block based on the pixel blocks of the extracted groups, and
  - generating the representative image having a resolution higher than the pixel blocks of each group based on (i) the pixel blocks of each group and (ii) the estimated phases, and
- the converting converts the generated representative images into vector information,
- the image processing further comprising:
- performing encoding based on (i) the positions of the extracted pixel blocks, (ii) the codes associated with the pixel blocks, (iii) the estimated phases, and (iv) the vector information.

25. A non-transitory computer-readable medium storing a program causing a computer to execute image processing, the image processing comprising:
- decoding positions of pixel blocks, phases of the pixel blocks, a code of each representative image corresponding to the pixel blocks, and vector information of each representative image from data encoded by the image processing apparatus according to claim 21;

generating each representative image from the decoded vector information;

storing each representative image generated and the corresponding code decoded in association with each other;

generating pixel blocks having a resolution lower than each representative image based on each representative image stored and the phases decoded; and generating an image based on the pixel blocks generated and the positions of the pixel blocks decoded.

26. A non-transitory computer-readable medium storing a program causing a computer to execute image processing, the image processing comprising:

decoding positions of pixel blocks, phases of the pixel blocks, a code of each representative image corresponding to the pixel blocks, and vector information of each representative image from data encoded by the image processing apparatus according to claim 21;

storing each vector information decoded and the corresponding code decoded in association with each other;

generating a representative image based on each vector information stored and the phases decoded; and generating an image based on the representative images generated and the positions of the pixel blocks decoded.

* * * * *